(12) United States Patent
Nakamura et al.

(10) Patent No.: US 7,390,981 B2
(45) Date of Patent: Jun. 24, 2008

(54) WEIGHING DEVICE FOR WEIGHING TARGET OBJECT IN CONTAINER, COMBINATION WEIGHING DEVICE INCLUDING THE SAME, AND WEIGHING METHOD

(75) Inventors: Yoshihiro Nakamura, Ritto (JP); Kazuhiro Suhara, Ritto (JP); Takashi Kimura, Ritto (JP); Masayoshi Nakajima, Ritto (JP); Shuji Murata, Ritto (JP); Yukio Wakasa, Ritto (JP); Fumitaka Tokuda, Ritto (JP)

(73) Assignee: Ishida Co., Ltd., Kyoto (JP)

( * ) Notice: Subject to any disclaimer, the term of this patent is extended or adjusted under 35 U.S.C. 154(b) by 0 days.

(21) Appl. No.: 10/595,328

(22) PCT Filed: Sep. 16, 2004

(86) PCT No.: PCT/JP2004/013548

§ 371 (c)(1),
(2), (4) Date: Apr. 10, 2006

(87) PCT Pub. No.: WO2005/036106

PCT Pub. Date: Apr. 21, 2005

(65) Prior Publication Data

US 2006/0289206 A1    Dec. 28, 2006

(30) Foreign Application Priority Data

Oct. 10, 2003  (JP) .............................. 2003-352806
Oct. 10, 2003  (JP) .............................. 2003-352808
Oct. 10, 2003  (JP) .............................. 2003-352816

(51) Int. Cl.
*G01G 13/00* (2006.01)
(52) U.S. Cl. ...................... 177/25.18; 177/52; 177/103; 177/145
(58) Field of Classification Search ............. 177/25.18, 177/52, 103, 145
See application file for complete search history.

(56) References Cited

U.S. PATENT DOCUMENTS

| 4,344,493 | A | * | 8/1982 | Salmonsen et al. ............ 177/52 |
| 4,418,772 | A | * | 12/1983 | Fukuda ........................ 177/1 |
| 4,420,051 | A | * | 12/1983 | Furuta et al. ............. 177/25.12 |
| 5,889,235 | A |   | 3/1999 | Kawanishi et al. |
| 7,015,399 | B2 | * | 3/2006 | Murata et al. ............ 177/25.18 |

FOREIGN PATENT DOCUMENTS

| DE | 8235299 U1 | 12/1983 |
| JP | 62/175624 A | 8/1987 |
| JP | 08-029242 A | 2/1996 |

* cited by examiner

*Primary Examiner*—Randy W Gibson
(74) *Attorney, Agent, or Firm*—Global IP Counselors, LLP

(57) ABSTRACT

A weighing device includes a supply unit, a weighing unit, a stock unit, a discharge unit, a transfer unit, and a revolving mechanism. The supply unit supplies a target object to a container revolving in the weighing unit. The weighing unit weighs the container while revolving the same. The stock unit stocks a plurality of containers while holding the plurality of containers three-dimensionally and revolving them. The discharge unit discharges the target object from the container while revolving the container.

19 Claims, 31 Drawing Sheets

(a)

(b)

WEIGHING DEVICE FOR WEIGHING TARGET OBJECT IN CONTAINER, COMBINATION WEIGHING DEVICE INCLUDING THE SAME, AND WEIGHING METHOD

TECHNICAL FIELD

The present invention relates to a weighing device for weighing food products such as, for example, potato chips or pickles, or industrial products or the like, which are placed in containers, a combination weighing device including the same, and a weighing method.

BACKGROUND ART

Conventionally, a weighing device is used for weighing a target object placed in a container, stocking a plurality of containers after the weight of each container is subtracted in order to obtain the weight of the target object, and retrieving a selected container to discharge the target object from the container.

For example, Japan Published Patent Application No. 8-29242 (published Feb. 2, 1996) discloses a combination weighing device which performs combination weighing by weighing a plurality of containers which each contain a target object, storing the weights, and stocking the plurality of containers.

However, the above-described conventional weighing device has the following problems.

The weighing device disclosed in patent document 1 performs weighing, stocking, and discharging while the containers are stationary. Therefore, time is wasted from the point at which a target object contained in one container is weighed until the target object is discharged. This makes it impossible to drive the conventional weighing device at high speeds.

An object of the present invention is to provide a weighing device capable of expediting the process of weighing to discharging, a combination weighing device including the same, and a weighing method.

SUMMARY OF THE INVENTION

A weighing device according to a first aspect of the present invention comprises a weighing unit, a stock unit, a discharge unit, and a moving mechanism. The weighing unit weighs a container into which one or more target objects has been placed while moving the container. The stock unit accumulates a plurality of the containers while moving containers transported from the weighing unit. The discharge unit discharges the target objects from containers selectively retrieved from the stock unit while moving the containers. The moving mechanism moves the containers in the weighing unit, the stock unit, and the discharge unit.

Here, the weighing unit weighs a container which is being moved toward the stock unit by the moving mechanism. The stock unit stocks the container while moving the container toward the discharge unit by means of the moving mechanism. The discharge unit discharges the target object from the container while moving the container toward the supply unit by means of the moving mechanism. Namely, each step of weighing, stocking, and discharging of the target object in each unit is performed while the container is constantly moving. Thus, compared with a conventional weighing device that performs each step while the container is stationary, the amount of time needed from the weighing to the discharge of the target object can be significantly reduced, and thereby make high speed operations possible.

A weighing device according to a second aspect of the present invention is the weighing device of the first aspect, and further comprises a transfer unit for transferring containers that is arranged in at least one position between the weighing unit, the stock unit, and the discharge unit.

Here, by providing a transfer unit in at least one position between the units, a container can be smoothly transferred from the weighing unit to the stock unit, or from the stock unit to the discharge unit.

A weighing device according to a third aspect of the present invention is the weighting device of the second aspect, and further comprises a moving direction change unit for changing the moving direction of the containers in the vicinity of the transfer unit.

Here, since the containers are always moving, the containers can be transferred smoothly merely by changing the moving direction of the containers in the transfer unit. Therefore, the containers can be smoothly transferred between the units.

A weighing device according to a fourth aspect of the present invention is the weighing device of any one of the first through third aspects, in which the weighing unit moves together with a container.

Here, since the weighing unit moves together with a container, the container can be weighed while being moved. Since the container need not be stationary in order to be weighed, the amount of time needed for the steps of supplying, weighing, accumulating, and discharging the target object can be reduced.

A weighing device according to a fifth aspect of the present invention is the weighing device of the fourth aspect, wherein the weighing unit is in a stationary state relative to the container when weighing the container.

Here, the weighing can be performed while the weighing unit and the container are in a stationary state with respect to each other. Therefore, even while the container is moving, weighing can be accurately performed in the same way as when the container is stationary.

A weighing device according to a sixth aspect of the present invention is the weighting device of any one of the first through fifth aspects, and comprises a plurality of weighing units.

Here, a plurality of weighing operations can be performed concurrently by a plurality of weighing units. Therefore, high speed weighing of a large amount of target objects will be made possible.

A weighing device according to a seventh aspect of the present invention is the weighing device according to any one of the first through sixth aspects, wherein the stock unit is located immediately upstream of the discharge unit.

Here, since the stock unit is located immediately upstream of the discharge unit in which the next discharge step is to be performed, the selected containers can be immediately transferred to the discharge unit.

A weighing device according to an eighth aspect of the present invention is the weighing device according to any one of the first through seventh aspects, wherein the weighing unit, the stock unit, and the discharge unit move the containers two-dimensionally.

Here, since the containers are moved two-dimensionally, the mechanism for moving the containers is not complicated and can be achieved with a simple structure.

A weighing device according to a ninth aspect of the present invention is the weighing device of any one of the first through eighth aspects, wherein at least one of the weighing units, the stock unit, and the discharge unit moves the containers three-dimensionally.

Here, since the containers are moved vertically as well as horizontally, the space for the device can be reduced.

A weighing device according to a tenth aspect of the present invention is the weighing device of any one of the first through ninth aspects, wherein the weighing unit, the stock unit, and the discharge unit continuously move a plurality of containers.

Here, since the weighing unit, the stock unit, and the discharge unit continuously move a plurality of containers, high speed processing of the target objects will be achieved.

A weighing device according to an eleventh aspect of the present invention is the weighing device of any one of the first through tenth aspects, wherein the moving mechanism rotates the weighing unit, the stock unit, and the discharge unit, and each of the rotating weighing unit, the stock unit, and the discharge unit move the containers.

Here, since the weighing unit, the stock unit, and the discharge unit operate while rotating, each of these units are provided with a function which transports the containers. Each operation is performed while moving the containers, and therefore high speed processing will be achieved.

A weighing device according to a twelfth aspect of the present invention is the weighing device of any one of the first through eleventh aspects, wherein the weighing unit, the stock unit, and the discharge unit each have a holding unit for holding the containers.

Here, each unit has a holding unit for holding the containers. For example, even when each unit moves the containers while rotating, the containers can be held with certainty.

A weighing device according to a thirteenth aspect of the present invention is the weighing device of the twelfth invention, wherein a transfer unit for transferring the containers is provided in at least one position between the weighing unit, the stock unit and the discharge unit, and a holding release member for releasing a container held by the holding unit is located in the vicinity of the transfer unit.

Here, a holding release member capable of forcibly releasing a container from the held state in the transfer unit is included. Therefore even when, for example, a container is held by a permanent magnet, the container can be forcibly released from the held state. The container can be smoothly transferred between the units without providing a large-scale device such as an electromagnet capable of electrically controlling the container to be held or released.

A weighing device according to a fourteenth aspect of the present invention is the weighing device of any one of the first through thirteenth aspects, and further comprises a supply unit for supplying a target object to a moving container.

Here, a supply unit is included in the weighing device in order to supply a target object to a container which is moving to the weighing device. Since, for example, a target object can be supplied to a container circulating in the weighing device, the process of supplying a target object to the discharge thereof can be expedited.

A weighing device according to a fifteenth aspect of the present invention is the weighing device of any one of the first through fourteenth aspects, wherein the container is in constant motion from the point at which it is supplied with a target object in the supply unit until it discharges the target object in the discharge unit and returned to the weighing unit.

According to the above, since the container is constantly moving nonstop in the steps from weighing to discharging, high speed processing in each step will be achieved.

According to a sixteenth aspect of the present invention, a combination weighing device comprises a plurality of weighing devices according to any one of the first through fifteenth aspects.

Here, since a plurality of the above-described weighing devices are included, the combination weighing device is capable of performing high speed weighing.

According to a seventeenth aspect of the present invention, a weighing method for weighing a target object contained in a container comprises first through third steps. The first step weights the container containing the target object while moving the container. The second step accumulates a plurality of the containers which have been weighed while moving the plurality of containers. The third step selectively retrieves a desired container from the plurality of accumulated containers and discharges the target object from the container while moving the container.

Here, a container moving toward the stock unit is weighed. The container is stocked while moving toward the discharge unit. A target object is discharged from the container while the container is moving toward the supply unit. Namely, each step of weighing, stocking, and discharging of the target object in each unit is performed while the container is constantly moving. Thus, compared with a conventional weighing device in which each step is performed while the container is stationary, the amount of time needed from when a target object is weighed until the target object is discharged can be significantly reduced, and thus high speed operation can be achieved.

A weighing device according to an eighteenth aspect of the present invention is the weighing device of any one of the first through fifteenth aspects, wherein the stock unit circulates, in the stock unit, a plurality of a containers received from the weighing unit.

Here, the stock unit accumulates and circulates a plurality of containers that have been weighed in the weighing unit until the containers are transferred to the discharge unit. In other words, with the weighing device according to the present invention, a plurality of containers accumulated in the stock unit await transfer to the discharge unit while being constantly moved. By stocking a plurality of containers while circulating the same, the containers can be in a constant state of movement.

Thus, once a container to be transferred to the discharge unit is selected, the container can be transferred to the discharge unit smoothly. The reason is that a container that is moving in the stock unit need only have its direction of movement changed toward the discharge unit. The step of transferring the container from the stock unit to the discharge unit can be expedited, compared to a weighing device in which a container stocked in a stationary state is again moved in order to transfer the container to the discharge unit, or a weighing device in which the containers are circulated in the entire device.

A weighing device according to a nineteenth aspect of the present invention is the weighing device of any one of the first through fifteenth aspects, wherein a new container is added to the stock unit from the weighing unit at a position at which a container that was transferred to the discharge unit had been held.

Here, when a container selected to have the target object therein discharged in the discharge unit is transferred to the discharge unit from the stock unit, a new container is added from the weighing unit. With the weighing device according to the present invention, the new container is added to the position which was vacated as a result of the selected container being transferred from the stock unit.

By adding a new container to the same position as the discharged container was in, it will not be necessary to move the other non-selected containers accumulated in the stock unit due to the addition of the new container. This eliminates unnecessary movement of the containers, and thus reduces the load on the target objects placed in the containers. Since a new container is added to the position at which the discharged container was held, unnecessary movement of the non-selected containers is eliminated and thus the process of discharging a container to adding a container in the stock unit can be expedited.

PREFFERED EMBODIMENTS OF THE INVENTION

Emodiment 1

Overall Structure of the Weighing Device

Figure 1:
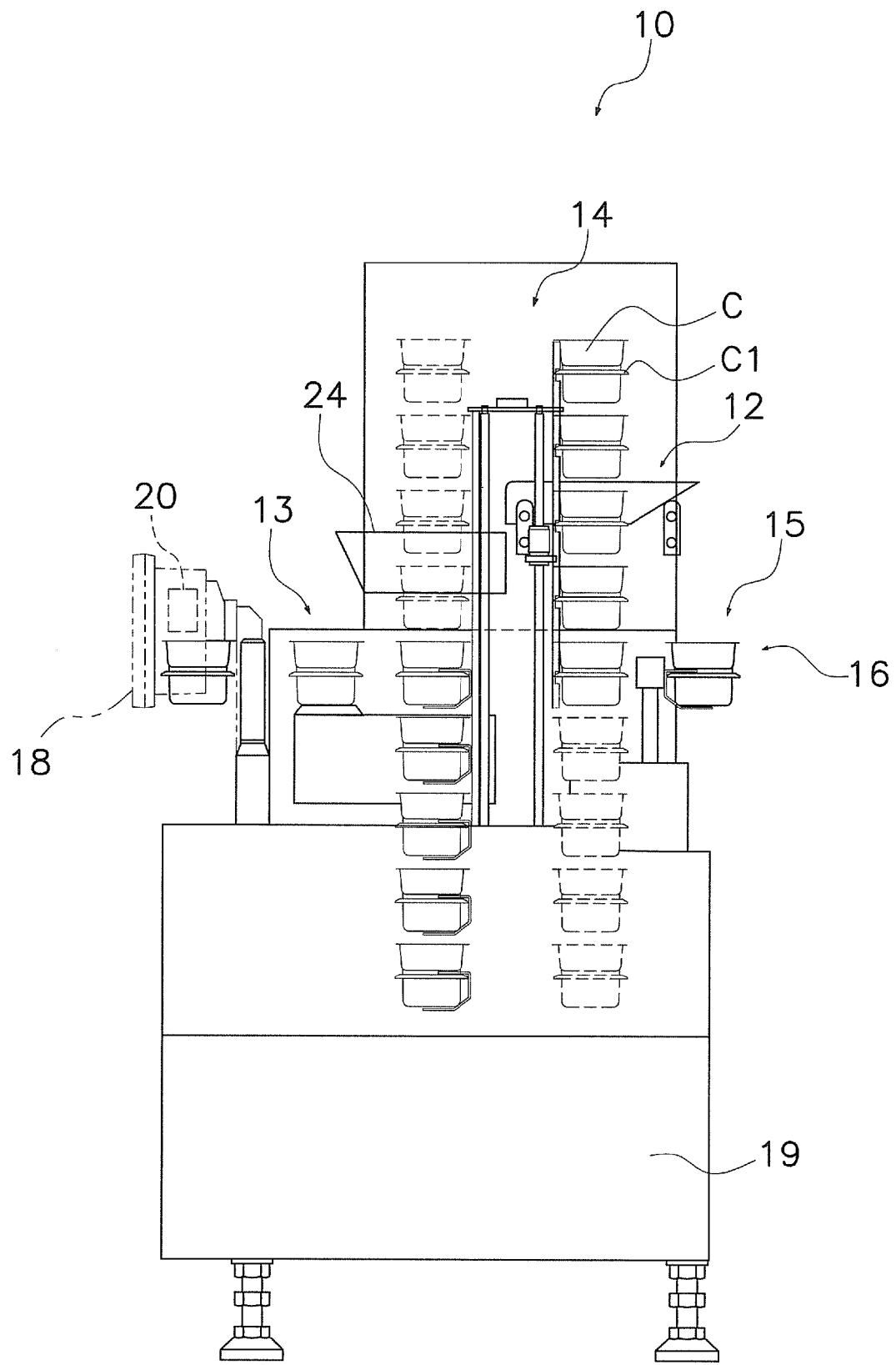
FIG. 1 is a front view of a weighing device according to one embodiment of the present invention.
Figure 2:
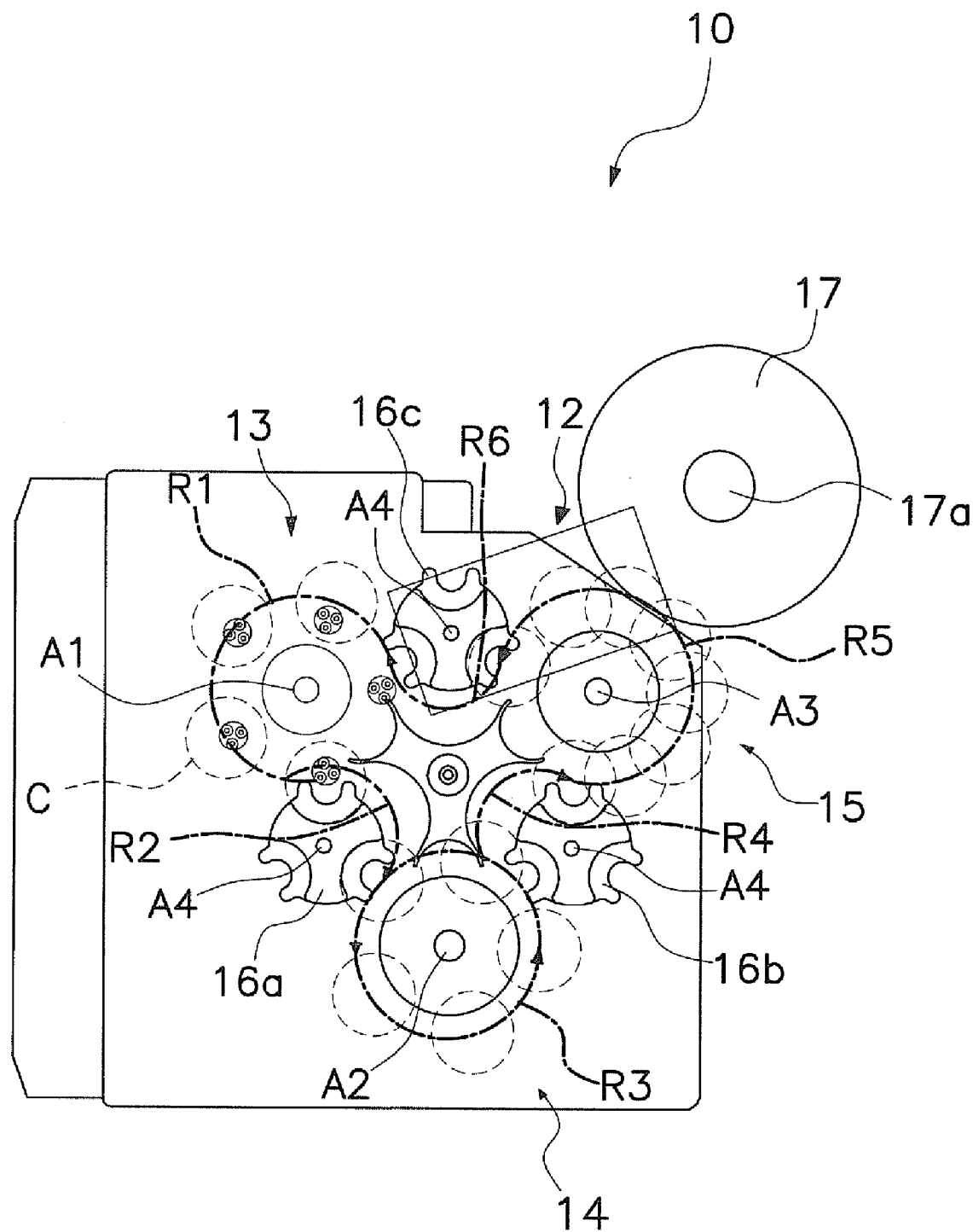
FIG. 2 is a plan view of the weighing device shown in FIG. 1.

A weighing device 10 according to one embodiment of the present invention weighs a target object, such as food or the like, contained in a container C having a top opening, retrieves a desired container C amongst a plurality of stocked containers C, and discharges the target object from the container C. As shown in FIG. 1 and FIG. 2, the weighing device 10 mainly includes a supply unit 12, a weighing unit 13, a stock unit 14, a discharge unit 15, transfer units 16*a* through 16*c*, a discharge chute 17, an operation unit 18, and a revolving mechanism 19.

The container C is a drinking glass-like container having a top opening and has a brim portion C1 around an outer circumference thereof. The container C transports a target object from a supply position to a discharge position while circulating in the weighing device 10. The container C circulates in the weighing device 10 while constantly being moved in the weighing unit 13, the stock unit 14, and the discharge unit 15. Therefore, with the weighing device 10 in this embodiment, the steps of supplying, weighing, stocking, and discharging a target object are performed on the container C which is moving. The container C is formed of metal or partially formed of metal, and is held in the weighing unit 13, the stock unit 14, and the discharge unit 15 described below by a magnetic force present in each of these units.

The supply unit 12 places a target object to be weighed by the weighing device 10 into a container C which is moving.

The weighing unit 13 includes a plurality of weighing members 25*a* through 25*e* (see FIG. 5), and weighs an empty container C that does not contain a target object and a container C that does contain a target object.

The stock unit 14 stocks a plurality of containers C each containing a target object.

The discharge unit 15 inverts a desired container C, retrieved from the plurality of containers C accumulated in the stock unit 14 three-dimensionally, while moving the desired container C toward the supply unit 12. Thus, the target object contained in the container C can be discharged at a desired position.

The transfer units 16*a* through 16*c* are respectively located between the weighing unit 13 and the stock unit 14, between the stock unit 14 and the discharge unit 15, and between the discharge unit 15 and the weighing unit 13. The transfer units 16*a* through 16*c* each transfer the containers C between the respective units.

The discharge chute 17 is a funnel-like member having a top opening and a bottom opening 17*a* and is located in the vicinity of the discharge unit 15. The discharge chute 17 discharges a target object, which is discharged from the container C inverted in the discharge unit 15, from the bottom opening 17*a*.

The operation unit 18 receives a setting value such as a drive rate or the like input by a user, and displays various types of information regarding the drive rate or the like.

These main elements will be described below in detail.

As shown in FIG. 2, the weighing device 10 in this embodiment includes a supply and weighing zone R1, a container transfer zone R2, a stock zone R3, a container transfer zone R4, a discharge zone R5, and a container transfer zone R6 formed along a moving path of the containers C. The containers C circulate in the weighing device 10 while moving sequentially from zone R1 to zone R6. In FIG. 2, the one-dot chain lines represent the track of the center of the containers C circulating in the weighing device 10.

The supply and weighing zone R1 is a zone in the weighing unit 13 where a target object is supplied to the containers C, and the containers C and the target object are weighed. In this zone, empty containers C are first weighed. Then, a target object is put into the containers C, and the containers C containing the target object are weighed. The container transfer zone R2 is a zone in the transfer unit 16a where the weighed containers C are received from the weighing unit 13 and transferred to the stock unit 14. The stock zone R3 is a zone in the stock unit 14 where the containers C are received from the transfer unit 16a and accumulated three-dimensionally. In this zone, a plurality of weighed containers C are accumulated three-dimensionally. The plurality of containers C are circulated in the stock unit 14. The container transfer zone R4 is a zone where a container C selected by a control unit 20 from amongst the plurality of containers C accumulated in the stock unit 14 is received and transferred to the discharge unit 15. The discharge zone R5 is a zone where the container C received from the transfer unit 16b is inverted while revolving (or traveling on a substantially circular path), and the target object is discharged toward the bottom opening 17a of the discharge chute 17 as a discharge target position. The container transfer zone R6 is a zone where the container C, emptied after the target object is discharged, is received from the discharge unit 15 and transferred back to the weighing unit 13.

The weighing device 10 in this embodiment circulates the containers C therein through the zones R1 through R6 as described above.

The term "upstream" and "downstream" used below each represent a direction with respect to the above-described circulation direction of the containers C.

Structure of the Supply Unit

Figure 3:
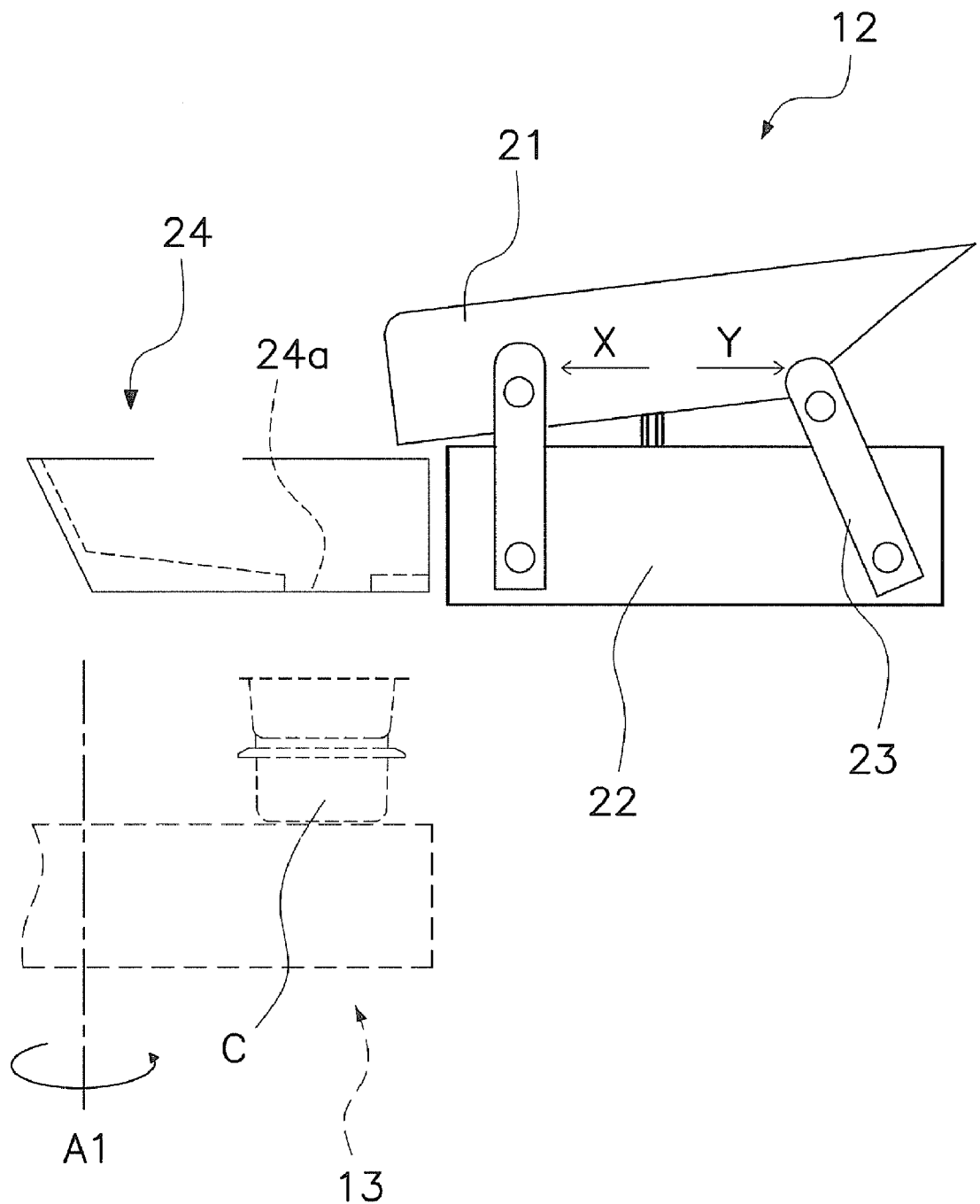
FIG. 3 is a lateral view of a supply unit included in the weighing device shown in FIG. 1.

As shown in FIG. 1 and FIG. 2, the supply unit 12 is a feeder, located above the revolving track of the containers C in the weighing unit 13, for putting target objects into the containers C revolved by the weighing unit 13. As shown in FIG. 3, the supply unit 12 includes a trough 21 and a motor box 22. The target object is put into a chute 24 provided below the trough 21.

A target object which is to be put into a container C is placed in the trough 21. A drive motor in the motor box 22 is rotated to move the trough 21 in an X direction in FIG. 3 slowly and in a Y direction faster than in the X direction. Thus, the target object which is placed in the trough 21 can be gradually but continuously transported toward the chute 24.

The target object is dropped from the trough 21 to the chute 24, and is transferred from the chute 24 into the container C that is revolved by the weighing unit 13. Namely, the supply unit 12 puts a target object into the container C that is revolved around a rotation shaft A1 by the weighing unit 13. In this manner, the operation is faster than when the target object is put into a stationary container C.

The chute 24 is formed of stainless steel and has a top opening and a bottom opening. The chute 24 collects target objects coming from the trough 21 and drops the target objects from directly above the container C revolving in the weighing unit 13.

Structure of the Weighing Unit

Figure 4:
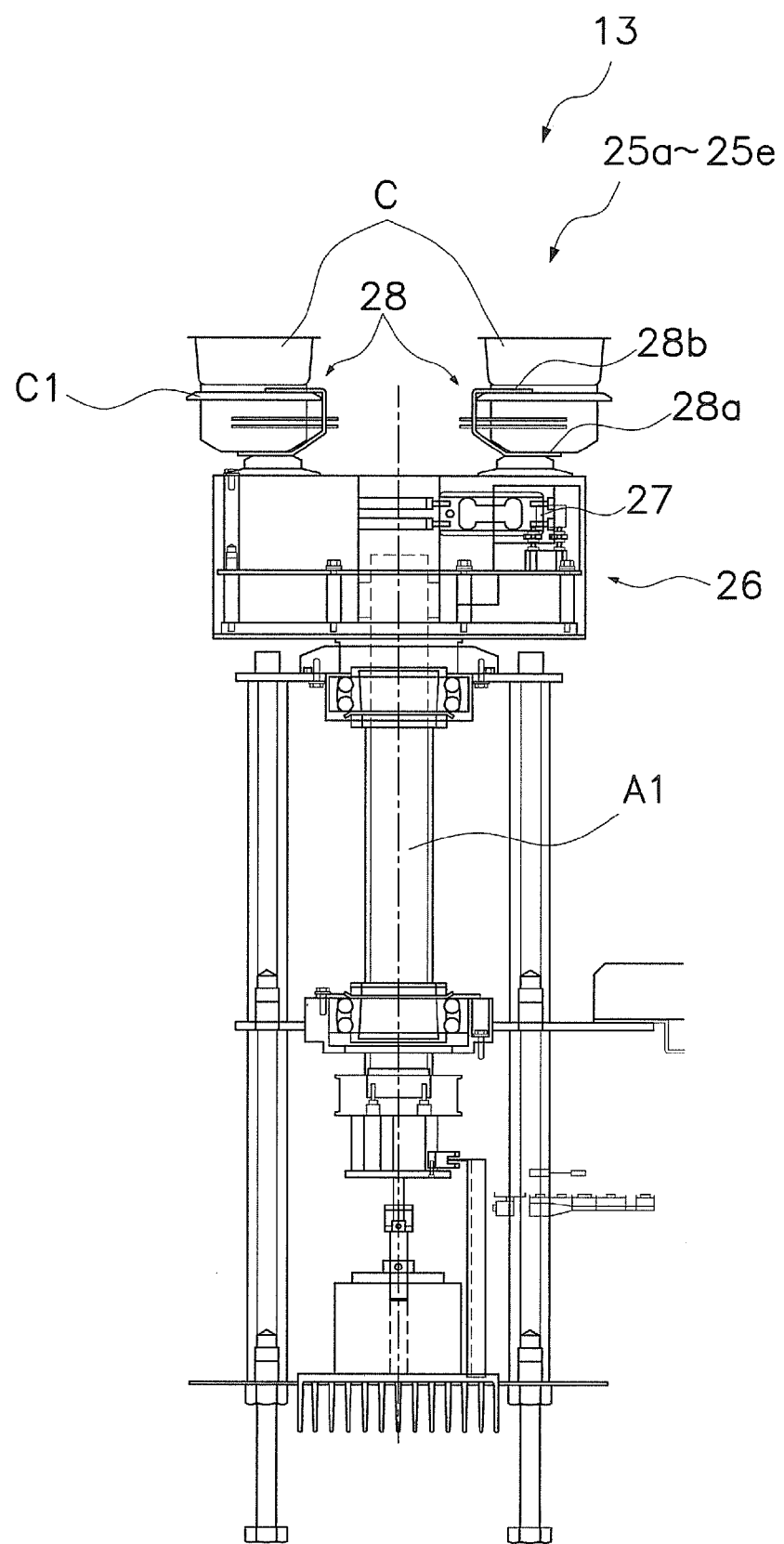
FIG. 4 is a partial, lateral cross-sectional view of a weighing unit included in the weighing device in FIG. 1.
Figure 5:
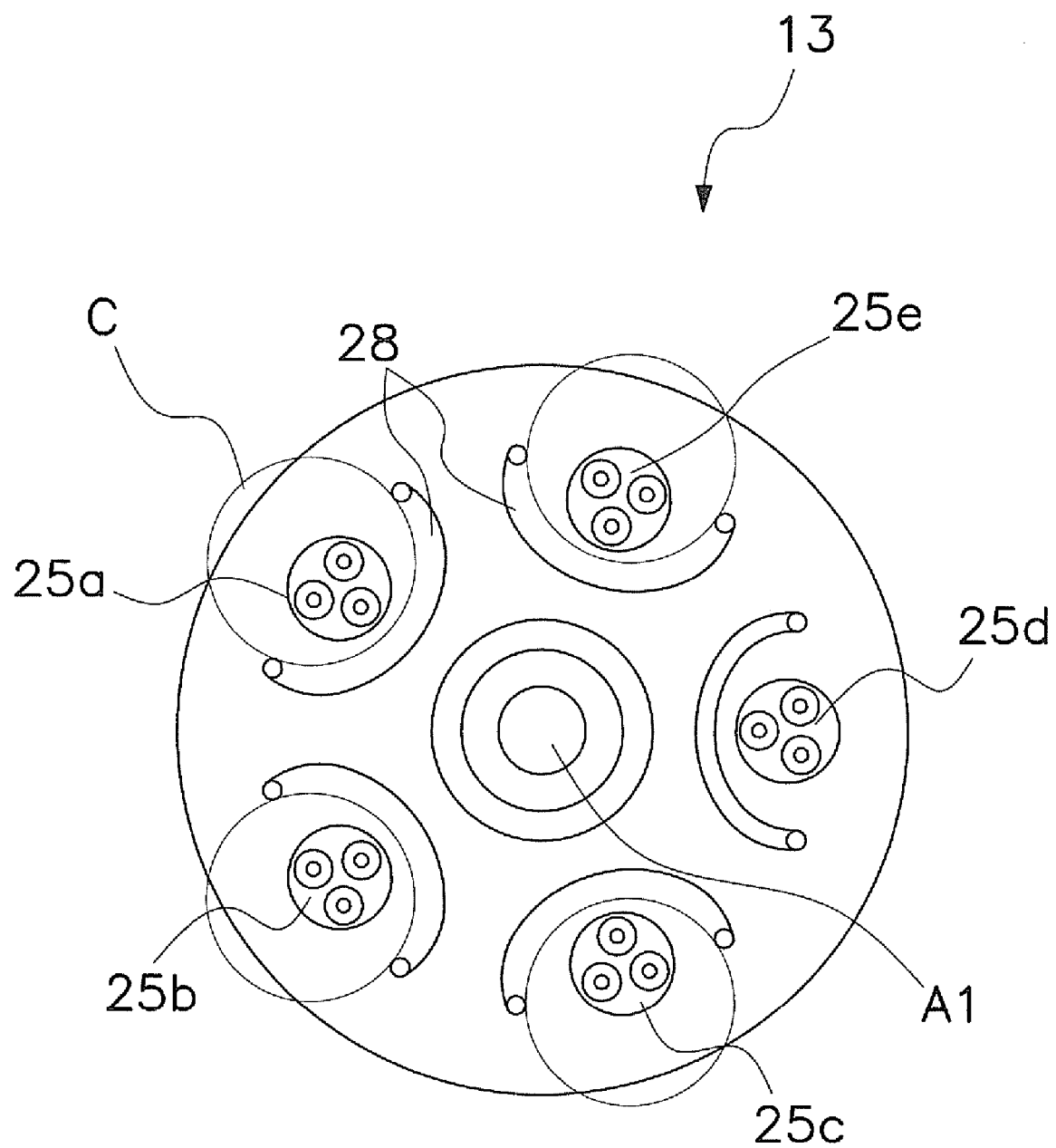
FIG. 5 is a plan view of the weighing unit shown in FIG. 4.

The weighing unit 13 weighs the target objects contained in the containers C. As shown in FIG. 2, the weighing unit 13 is located downstream of the discharge unit 15 and upstream of the stock unit 14. As shown in FIG. 4 and FIG. 5, the weighing unit 13 includes five weighing members 25a through 25e, and holders 28 that correspond to the weighing members 25a through 25e. The weighing unit 13 causes the weighing members 25a through 25e or the like to revolve around the rotation shaft A1, which receives a rotational drive force transmitted from the revolving mechanism 19 described below. Thus, the weighing unit 13 also functions as a transporting mechanism for the containers C. The revolving mechanism 19 for rotating the rotation shaft A1 will be described below in detail.

As shown in FIG. 4, the weighing members 25a through 25e each have a load cell 27 in a circular box 26. The weighing members 25a through 25e each weigh a container C held by the holder 28 while the container C is revolving. Since weighing is performed while the containers C are revolving toward the stock unit 14 for the next step, the process of weighing to stocking can be expedited. Even though weighing is performed while the containers C are moving, the time until a container C revolves to the transfer position in the transfer unit 16a provided between the weighing unit 13 and the stock unit 14 will be sufficient to perform weighing.

Each holder 28 includes a bottom plate 28a for supporting a bottom surface of the container C from below and a U-shaped member 28b. The U-shaped member 28b covers the brim portion C1 formed around the outer circumference of the container C to hold the container C between the bottom plate 28a and the U-shaped member 28b. The bottom plate 28a of the holder 28 has a magnet (permanent magnet) embedded therein. A container C formed of metal can be held due to the magnetic force of the magnet. The magnet may be embedded in a side wall instead of the bottom plate 28a, or may be embedded in both the bottom plate 28a and the side wall. This also applies to the holders 31 and 35 described below.

Weighing is performed in a state in which the containers C and each of the weighing members 25a through 25e are stationary relative to each other. Namely, weighing is performed in which the containers C and each of the weighing members 25a through 25e are moving at the same speed. Thus, even though the containers C are moving, weighing can be accurately performed in the same way as when the containers C are stationary.

The weighing unit 13 receives the containers C, emptied after the target object is discharged in the discharge unit 15, from the transfer unit 16c, and moves the empty containers C to directly below a bottom opening 24a of the chute 24 in the supply unit 12 while weighing the empty containers C. In this manner, the weighing unit 13 receives the containers C which have been subjected to the steps of weighing to discharging, and sends the containers C back to repeat these steps. Thus, the containers C can be circulated in the weighing device 10.

Structure of the Stock Unit

Figure 6:
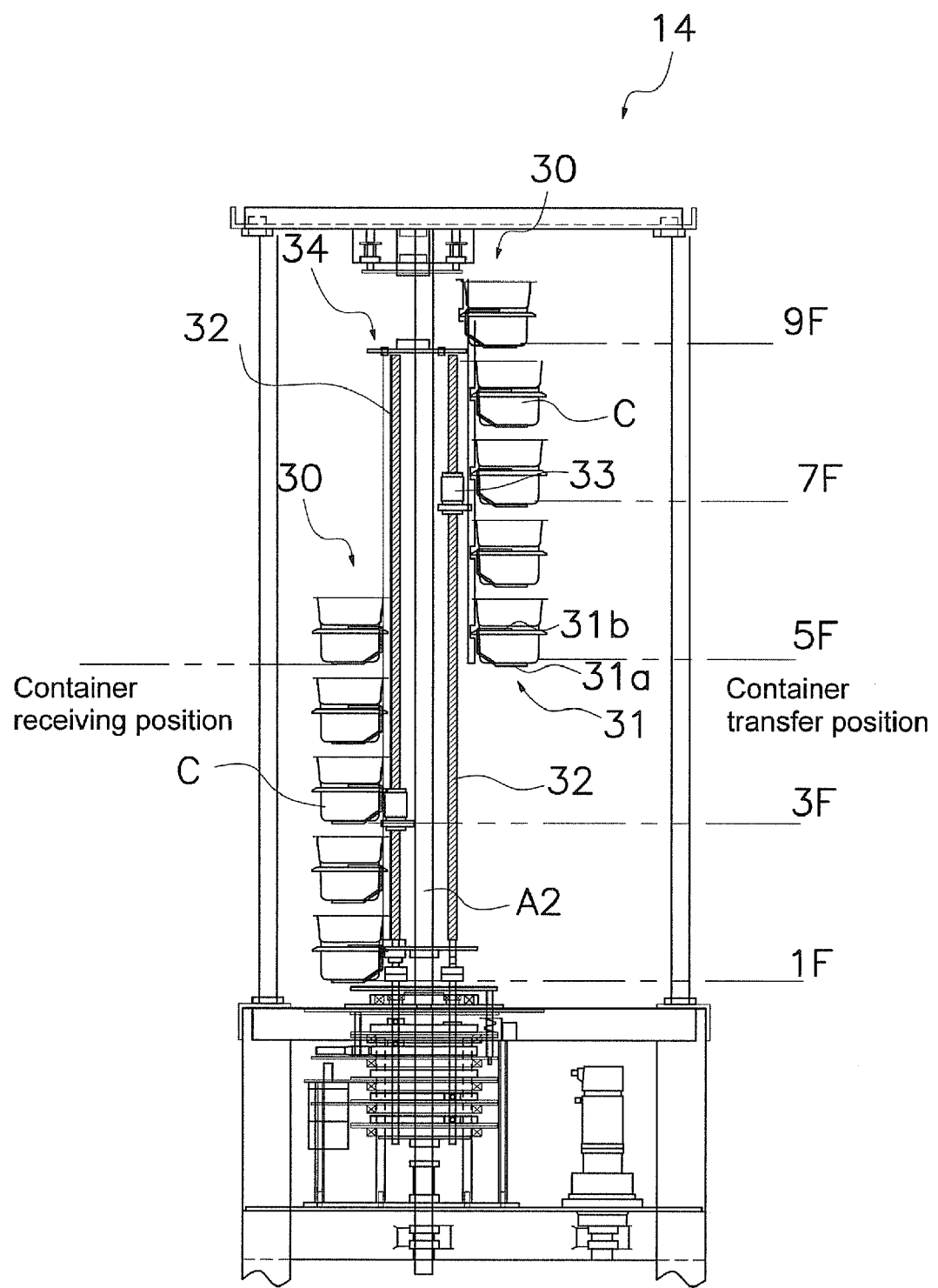
FIG. 6 is a lateral view of a stock unit included in the weighing device shown in FIG. 1.
Figure 7:
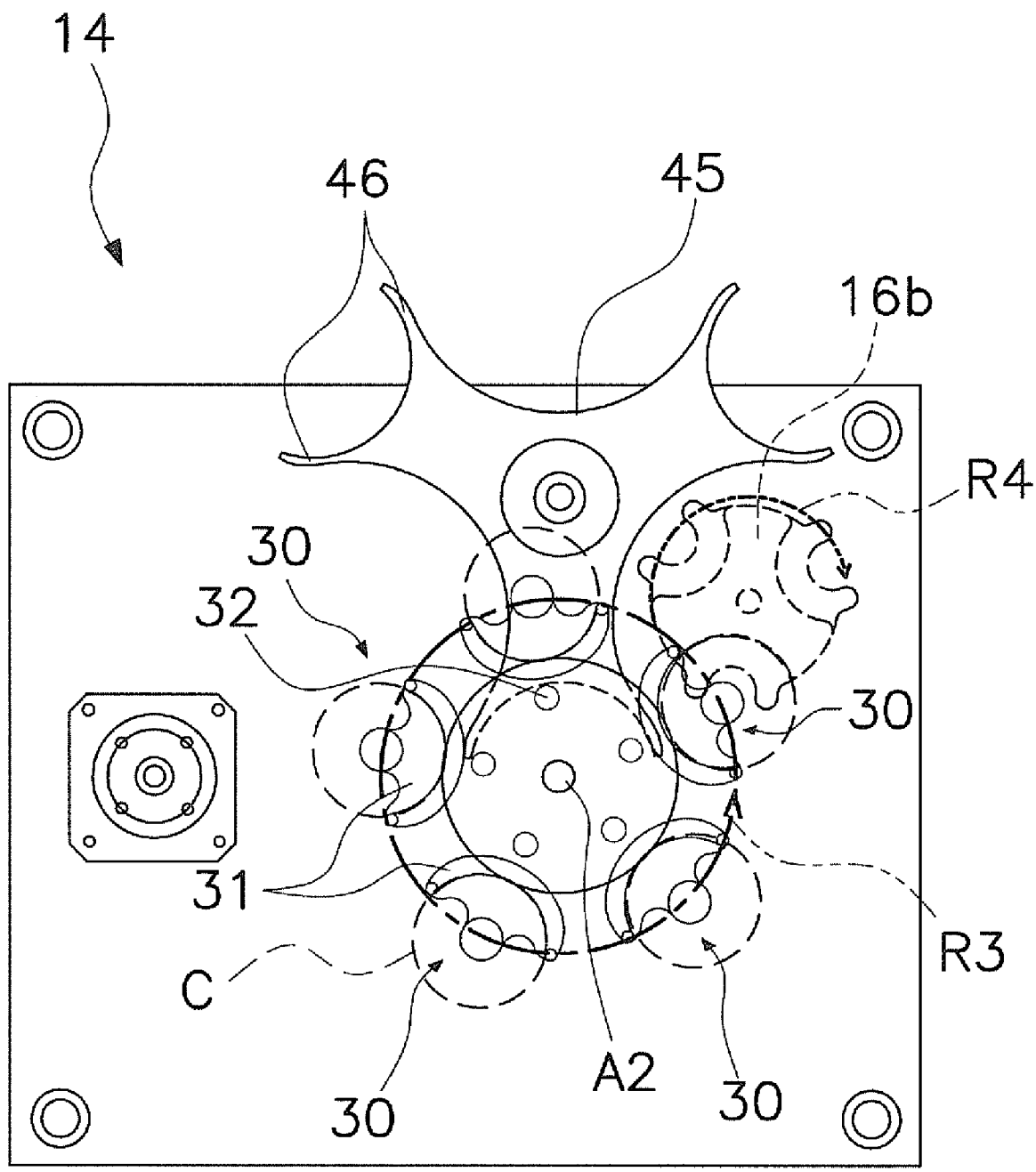
FIG. 7 is a plan view of the stock unit shown in FIG. 6.

The stock unit 14 stores a plurality of containers C which have been weighed in the weighing unit 13. As shown in FIG. 2, the stock unit 14 is located downstream of the weighing unit 13 and immediately upstream of the discharge unit 15. Therefore, the stock unit 14 can immediately transfer a container C selected by the control unit 20 (see FIG. 1) to the discharge unit 15. As shown in FIG. 6 and FIG. 7, the stock unit 14 includes five accumulation units 30 each capable of holding five containers C vertically. The accumulation units 30 are located at equal intervals in a circumferential direction around a rotation shaft A2.

The accumulation units 30 each have five holders 31 arranged vertically in order to hold five containers C vertically. Like the holder 28 in the weighing unit 13, each holder 31 has a bottom plate 31a for supporting the bottom surface of a container C from below and a U-shaped member 31b. The holder 31 also holds a metal container C owing to the magnetic force of the magnet embedded in the bottom plate 31a.

The stock unit 14 causes the accumulation units 30 to revolve around the rotation shaft A2. Thus, the stock unit 14 also functions as a transporting mechanism for the containers C, like the weighing unit 13. The stock unit 14 stocks the containers C while constantly causing the containers C to revolve horizontally. Therefore, once a container C is selected by the control unit 20, the selected container C can be immediately transferred to the transfer unit 16b from the stock unit 14.

The stock unit 14 also has a mechanism 34 for moving the accumulation units 30 vertically.

The mechanism 34 includes shafts 32 each having a screw groove formed therein, motors (not shown) located below the shafts 32 for rotating the shafts 32, and coupling members 33 for coupling accumulation units 30 and the shafts 32. The mechanism 34 rotates the shafts 32 forward and rearward by the motors attached to the bottom of the five shafts 32 so as to move the coupling members 33 attached to the shafts 32 up and down. More specifically, the motor for rotating each shaft 32 constantly rotates the shaft 32 in synchronization with the rotation rate of the rotation shaft A2. Therefore, the shaft 32 can be stationary with respect to the rotation shaft A2 while revolving around the rotation shaft A2. In order to move the containers C vertically, the rotation rate of the motor for constantly rotating the shaft 32 is increased or decreased, so as to rotate the shaft 32 forward or rearward with respect to the rotation shaft A2. As a result, the containers C held in each accumulation unit 30 can be moved vertically together with the coupling member 33.

Since the stock unit 14 includes the mechanism 34 for moving the containers C vertically, the stock unit 14 can store a plurality of containers C three-dimensionally. In addition, containers C which have been horizontally moved from the transfer unit 16a are accumulated vertically and the containers C which have been accumulated vertically are moved horizontally and transferred to the transfer unit 16b. Therefore, the moving direction and the accumulating direction of the containers C can interest with each other. At the start of driving, the five accumulation units 30 are located between 3F and 7F shown in FIG. 6. In response to a request to select a container C from the control unit 20, the five accumulation units 30 each move vertically between 1F and 9F while holding five containers C. In FIG. 6, 1F through 9F represent floors at which the containers C are vertically located.

With the weighing device 10 in this embodiment, the accumulation units 30 holding five containers C vertically receive and transfer containers C at the height of 5F, which corresponds to the center of each accumulation unit 30 at the start of driving. Thus, regardless of which floor the container C to be retrieved is held, the vertical moving distance of the accumulation unit 30 can be limited to two floors up or down with respect to 5F.

The stock unit 14 receives and transfers a container C at the same floor (height). Namely, as shown in FIG. 6, a container C is received from the transfer unit 16a at 5F and transferred to the transfer unit 16b also at 5F. Owing to the system of receiving and transferring a container C at the same height, after a container C is discharged, a new container C can be added at the same position merely by causing the accumulation units 30 to revolve around the rotation shaft A2.

Structure of the Discharge Unit

Figure 8:
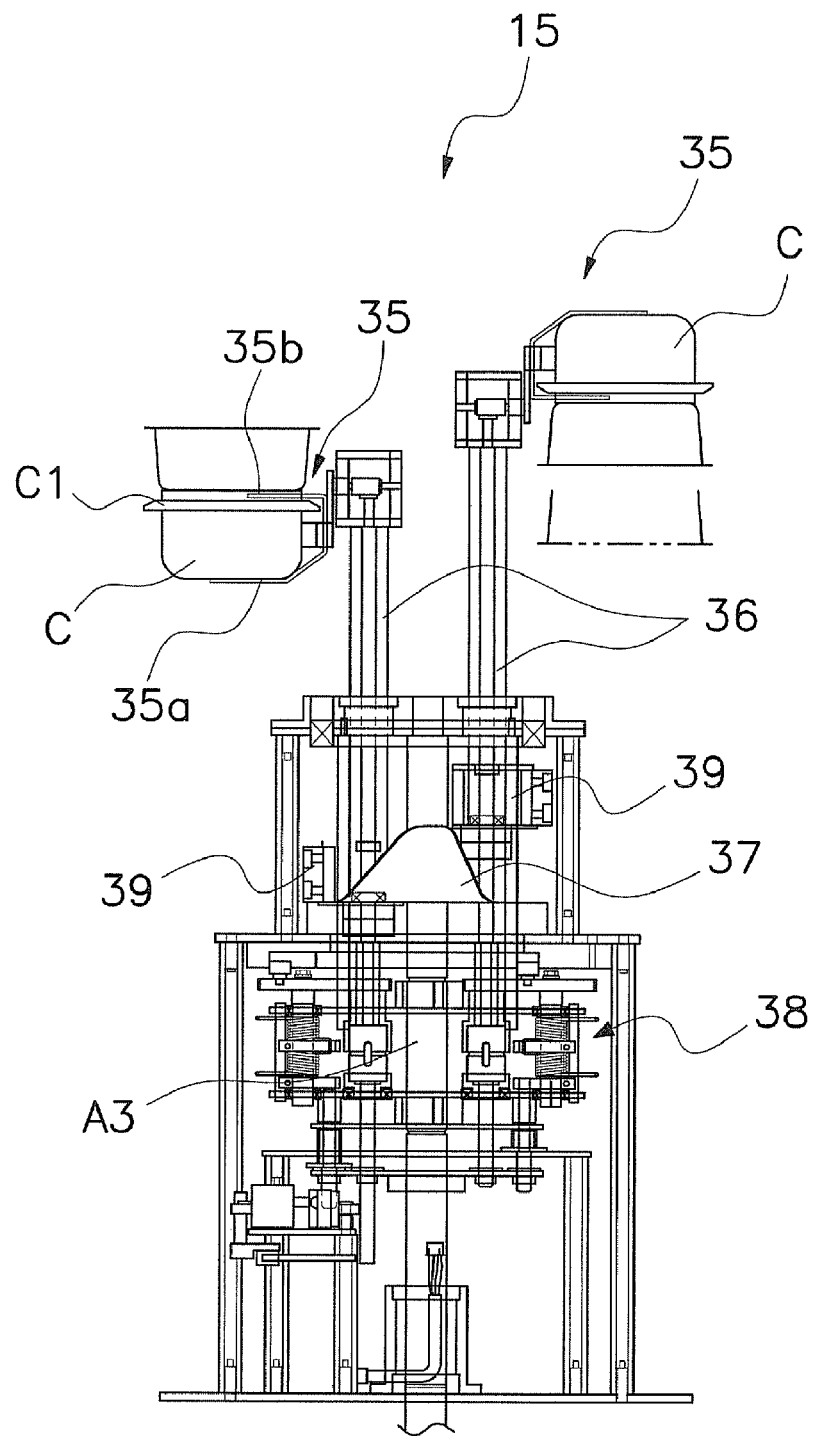
FIG. 8 is a lateral view of a discharge unit included in the weighing device shown in FIG. 1.
Figure 9:
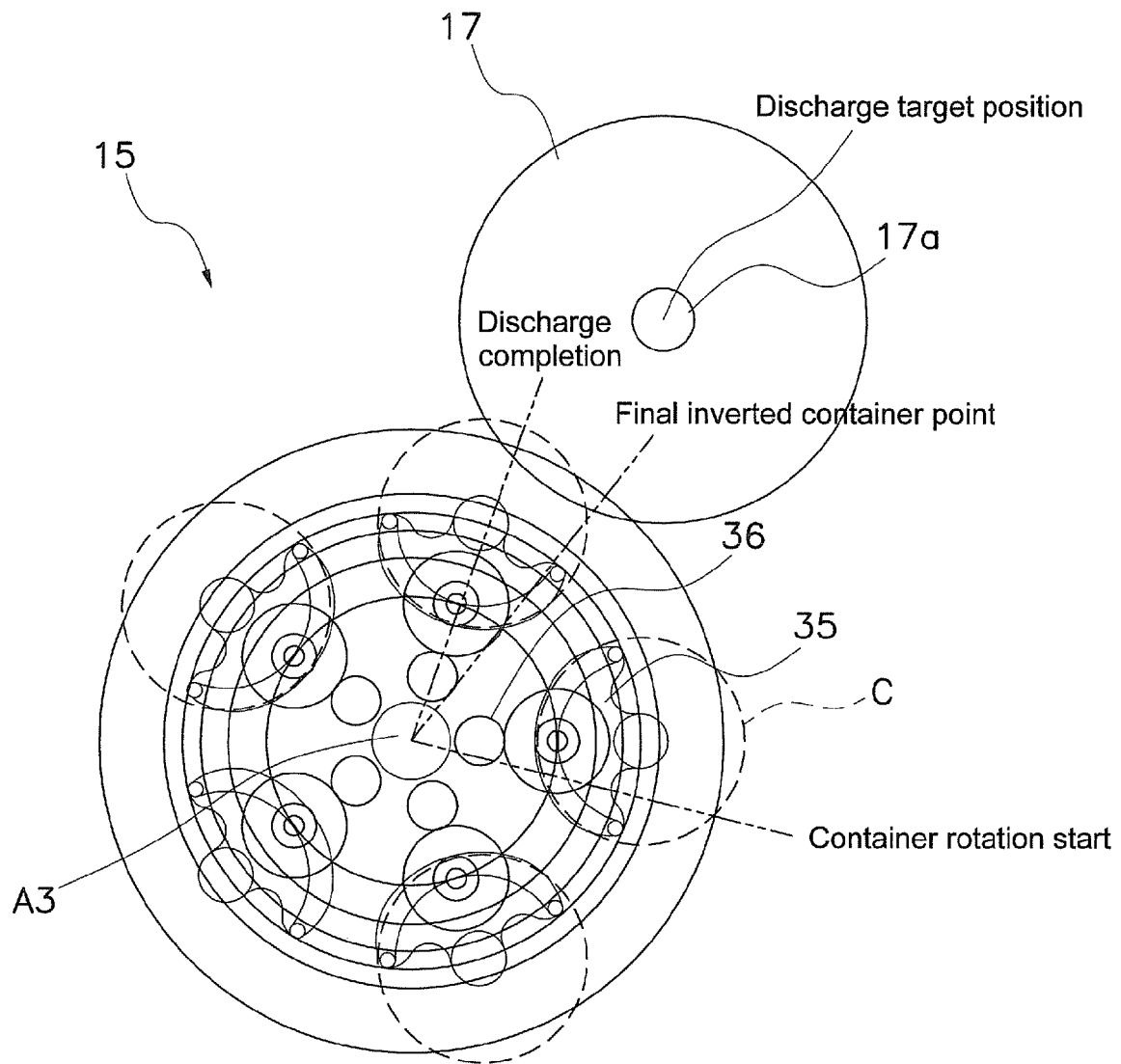
FIG. 9 is a plan view of the discharge unit shown in FIG. 8.

The discharge unit 15 discharges a target object, which has been transported in a container C, from the container C. As shown in FIG. 2, the discharge unit 15 is located downstream of the stock unit 14 and upstream of the weighing unit 13. As shown in FIG. 8 and FIG. 9, the discharge unit 15 includes five holders 35, five shafts 36, an inclining plate 37, a rotation shaft A3, and an inversion mechanism (inversion unit) 38.

Like the holder 28 in the weighing unit 13 and the holder 31 in the stock unit 14, each holder 35 has a bottom plate 35a for supporting the bottom surface of a container C from below and a U-shaped member 35b. The holder 35 also holds a container C formed of metal owing to the magnetic force of the magnet embedded in the bottom plate 35a. The five holders 35 are located in a circumferential direction around the rotation shaft A3 at an equal interval, and revolve around the rotation shaft A3.

Each shaft 36 is a hollow metal cylinder extending vertically and having the holder 35 attached to a top end thereof. Inside the shaft 36, members including a cam and a gear forming the inversion mechanism 38 for inverting the holder 35 are provided.

As shown in FIG. 10(a) through FIG. 10(f), guide units 39 respectively attached to bottom of the five shafts 36 are raised along an inclining surface of the inclining plate 37. The five shafts 36 are provided parallel to each other and are revolving around the rotation shaft A3. Owing to such a structure, the holder 35 attached to the top end of each shaft 36 and the container C held by the holder 35 can be moved vertically.

In order to discharge a target object P from a container C, the inversion mechanism 38 drives the cam and the gear thereof provided inside the shaft 36 to rotate the holder holding the container C at 180 degrees. The timing at which the inversion mechanism 38 rotates the container C is controlled by the control unit 20 (see FIG. 1), such that the target object P is discharged toward a desired discharge position in the discharge chute 17, i.e., toward the bottom opening 17a. The container C, which has been inverted by the inversion mechanism 38 so as to open downward, is held by the U-shaped member 35b of the holder 35 supporting the brim portion C1 from below.

The rotation shaft A3 causes containers C to revolve together with the holders 35. Thus, like the weighing unit 13 and the stock unit 14, the discharge unit 15 also functions as a transporting mechanism for the containers C as a result of receiving rotational drive force transmitted from the revolving mechanism 19 described below. The rotation shaft A3 rotates in synchronization with the other rotation shafts A1 and A2, A4 owing to the rotational drive force from the rotation motor M1 included in the revolving mechanism 19 described below.

With the weighing device 10 in this embodiment, the discharge unit 15 discharges a target object P from a container C while causing the container C to revolve around the rotation shaft A3. Therefore, the target object P in the container C is discharged from the container C by supplying centrifugal force thereto. As a result, the target object P discharged from the container C can be freely dropped to the bottom opening 17a by means of centrifugal force and gravity, or the vicinity thereof, with the bottom opening 17a positioned in a central portion of the discharge chute 17 located in a tangential direction of the revolving track of the container C around the rotation shaft A3.

Structure of the Transfer Units

As shown in FIG. 2, the transfer units 16a through 16c are respectively located between the weighing unit 13 and the stock unit 14, between the stock unit 14 and the discharge unit 15, and between the discharge unit 15 and the weighing unit 13. The transfer units 16a through 16c are all located at a height corresponding to 5F shown in FIG. 6.

The transfer unit 16a is provided between the weighing unit 13 and the stock unit 14, and receives a weighed container C from the weighing unit 13 and transfers the container C to the stock unit 14. The transfer unit 16b is provided between the stock unit 14 and the discharge unit 15, and receives a desired container C, selected by the control unit 20 (see FIG. 1) and moved to the position of 5F in FIG. 6, from the stock unit 14 and transfers the container C to the discharge unit 15. The transfer unit 16c is provided between the discharge unit 15 and the weighing unit 13, and receives an empty container C, after the target object is discharged in the discharge unit 15, from the discharge unit 15 and transfers the container C to the weighing unit 13. In this manner, the transfer units 16a through 16c transfer the container C between the steps of weighing, stocking, discharging, etc., and therefore the container C can be circulated in the weighing device 10.

Figure 11:
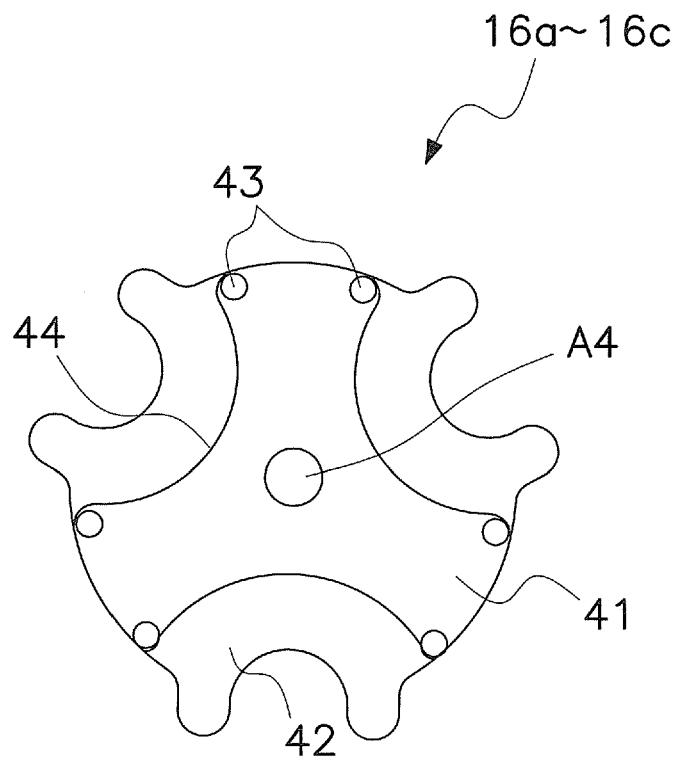
FIG. 11(*a*) is a plan view of a transfer unit, and FIG. 11(*b*) is a lateral view of the transfer unit.
Figure 11:
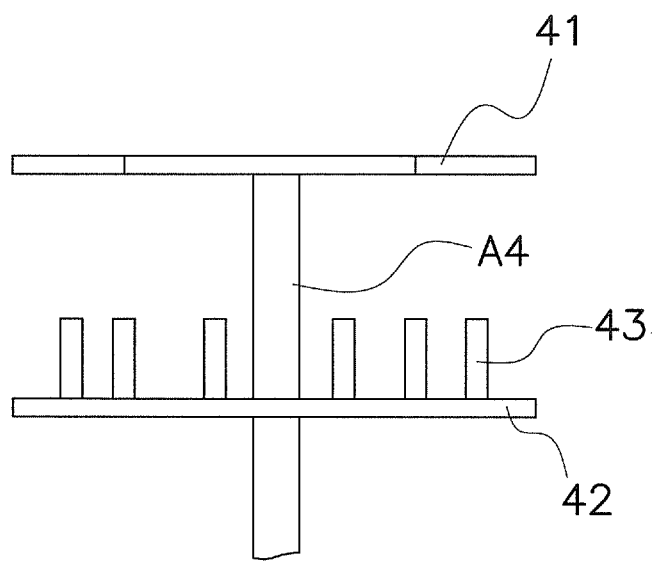

As shown in FIG. 11, the transfer units 16a through 16c have top plates 41, bottom plates 42, and three rotation shafts A4 respectively. Each top plate 41 has three arc-shaped portions 44 corresponding to an outer circumferential surface of a container C. Three containers C are held by the three arc-shaped portions 44. Each bottom plate 42 has six projections 43. A container C is fit between every two projections 43 and held from below. The three rotation shafts A4 receive a rotational drive force transmitted from the revolving mechanism 19 described below, and respectively rotate the transfer units 16a through 16c in synchronization. Thus, the transfer units 16a through 16c each function as a transporting mechanism as well as a function which transfers containers C between the units. The rotation direction of the transfer units 16a through 16c is opposite to the rotation direction of the weighing unit 13, the stock unit 14 and the discharge unit 15. Therefore, when a container C is transferred from each of the transfer units 16a through 16c to a corresponding unit, the container C keeps on moving generally in the same direction with no sharp curving. Thus, the container C can be transferred smoothly.

As shown in FIG. 7, a claw member (moving direction change unit, holding release member) 45 is provided in the vicinity of the transfer units 16a through 16c as a member used for transferring a container C.

The claw member 45 has claws 46 projecting in the vicinity of each of the transfer units 16a through 16c. The claw member 45 is fixed substantially at a central portion amongst the weighing unit 13, the stock unit 14, and the discharge unit 15 at a height corresponding to 5F shown in FIG. 6 at which a container C is received and transferred.

With the weighing device 10 in this embodiment, for example, a container C selected by the control 20 from the plurality of containers revolving in the stock unit 14 shown in FIG. 7 is moved vertically to the height corresponding to 5F. At the height corresponding 5F to which the container C to be retrieved has moved, the claw 46 of the claw member 45 projects. The container C is guided by the claw 46 so as to be off from the revolving track in the stock unit 14, and the moving direction of the container C to be retrieved is changed and the container C moves toward the transfer unit 16b. Thus, the container C can be released from the held state in the stock unit 14 and guided toward the transfer unit 16b.

As described above, the container C is forcibly released from the held state by the claw member 45 in the transfer unit 16b. Owing to this, even though the container C is held by the magnetic force of the permanent magnet in this embodiment, the container C can be released easily. Therefore, the container C can be released from the held state by a simple structure and transferred, without being electrically released using an electromagnet.

Similarly in the other transfer units 16a and 16c, a container C held in the weighing unit 13 and a container C held in the discharge unit 15 can be released using the claw 46 of the claw member 45, and the containers C are transferred between the weighing unit 13 and the stock unit 14 and between the discharge unit 15 and the weighing unit 13.

Structure of the Revolving Mechanism

Figure 12:
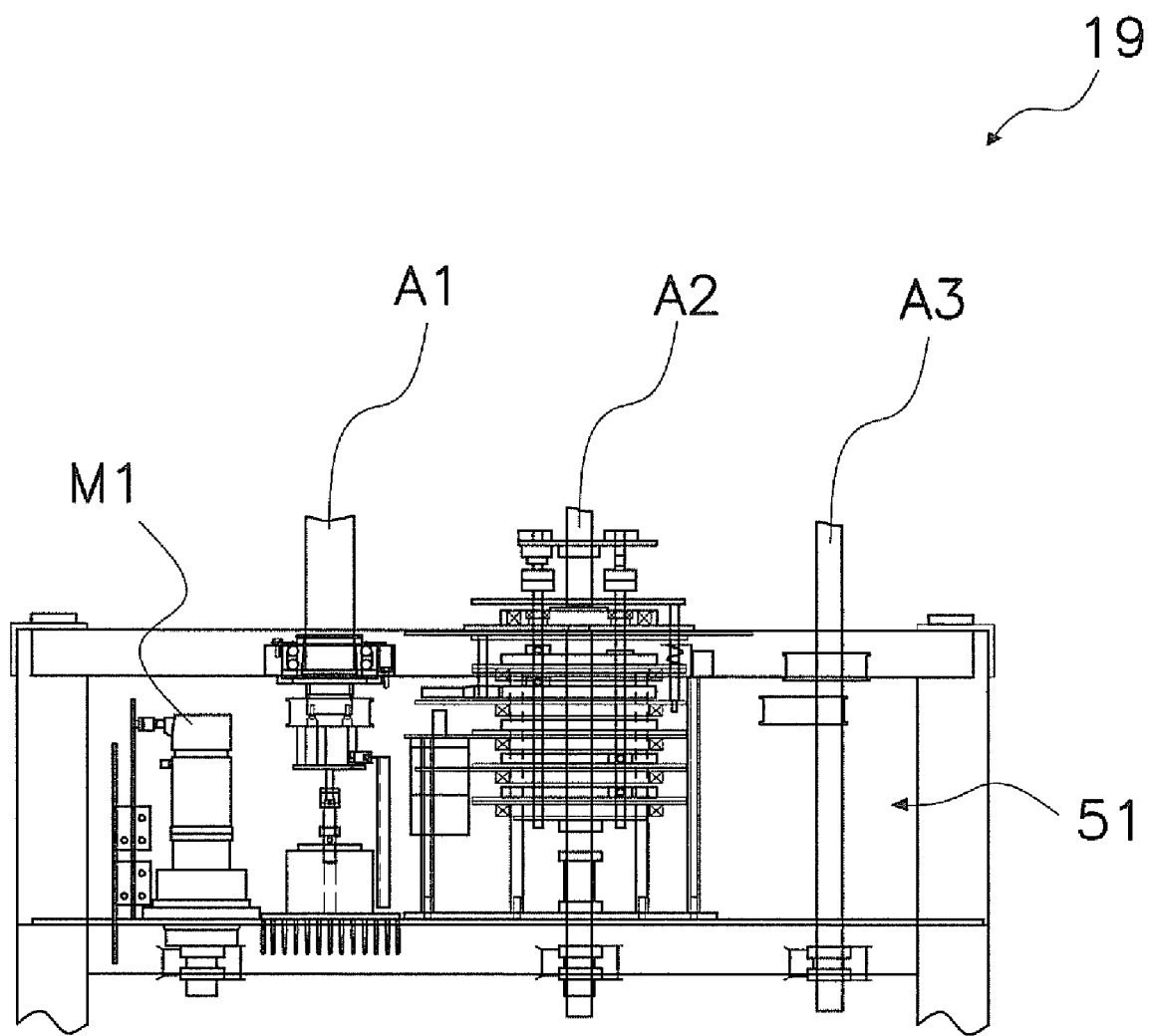
FIG. 12 is a lateral view of a circulation mechanism.

The revolving mechanism 19 included in the weighing device 10 in this embodiment imparts a rotational drive force to the weighing unit 13, the stock unit 14, the discharge unit 15, and the transfer units 16a through 16c as described above. As shown in FIG. 1, the revolving mechanism 19 is located in a bottom portion of the weighing device 10. As shown in FIG. 12, the revolving mechanism 19 includes the rotation motor M1 and a transmission unit 51.

The transmission unit 51 transmits a rotational drive force of the rotation motor M1 to the rotation shaft A1 in order to rotate the weighing unit 13, the rotation shaft A2 for rotating the stock unit 14, and the rotation shaft A3 for rotating the discharge unit 15, and the rotation shafts A4 for rotating the transfer units via a gear, a pulley and a belt (not shown). Thus, the rotation shafts A1 through A4 are rotated such that the weighing unit 13, the stock unit 14, and the discharge unit 15 are rotated in synchronization. The units for transferring the containers C are rotated in synchronization, which means that the adjacent units cause the containers C to revolve around at the same speed. Therefore, the containers C held in the units can be transferred smoothly.

As described above, the rotation shafts A4 rotate the transfers 16a through 16c in the opposite direction to the weighing unit 13, the stock unit 14 and the discharge unit 15. Therefore, with the weighing device 10 in this embodiment, the transmission unit 51 inverts the rotational direction of the rotational drive force to be transmitted to the rotation shafts A4.

Weighing to Discharging Operations of the Weighing Device of this Embodiment

Figure 13:
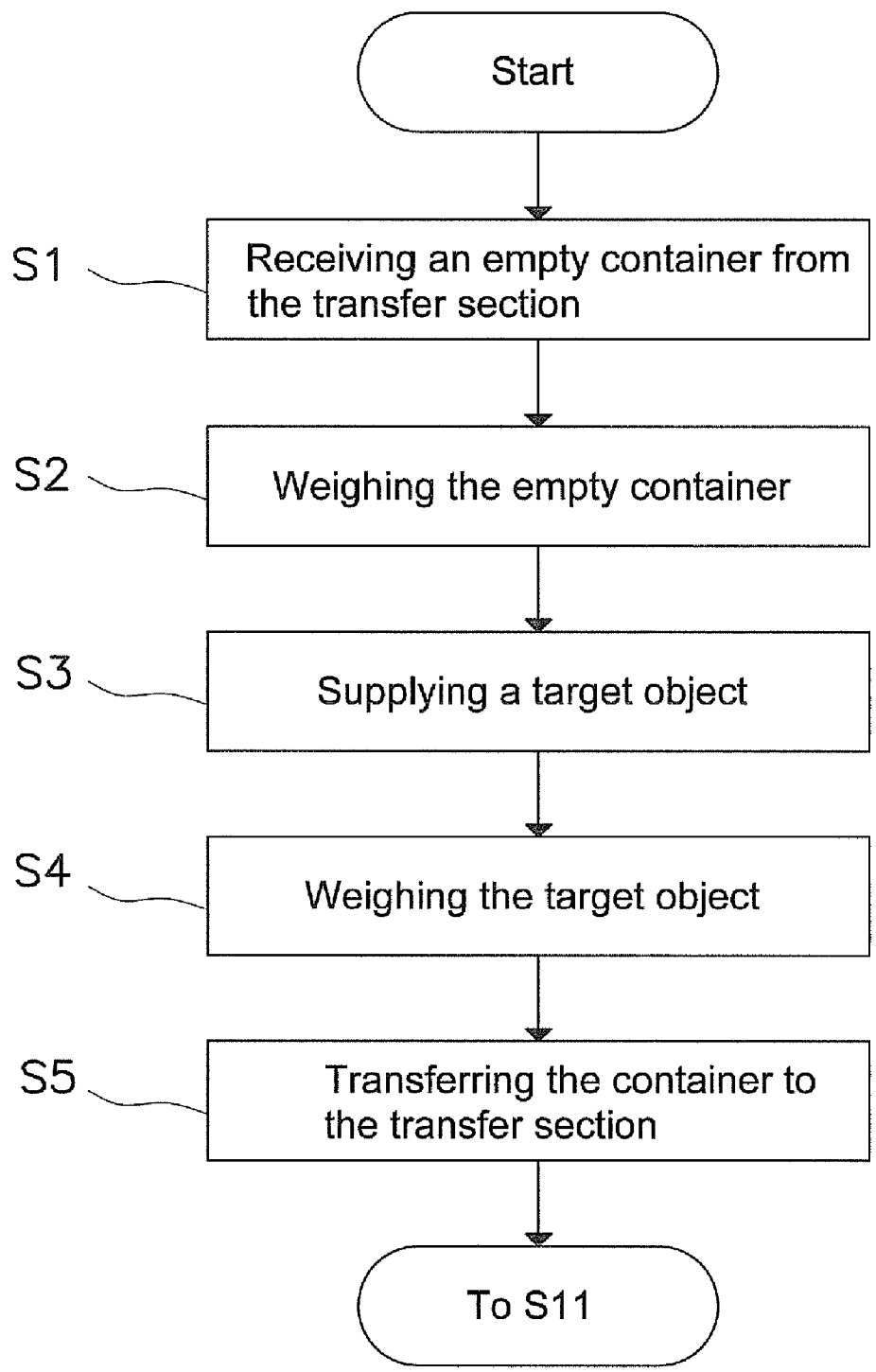
FIG. 13 is a flowchart showing the operation of a weighing device according to the present invention during supply and weighing steps.
Figure 14:
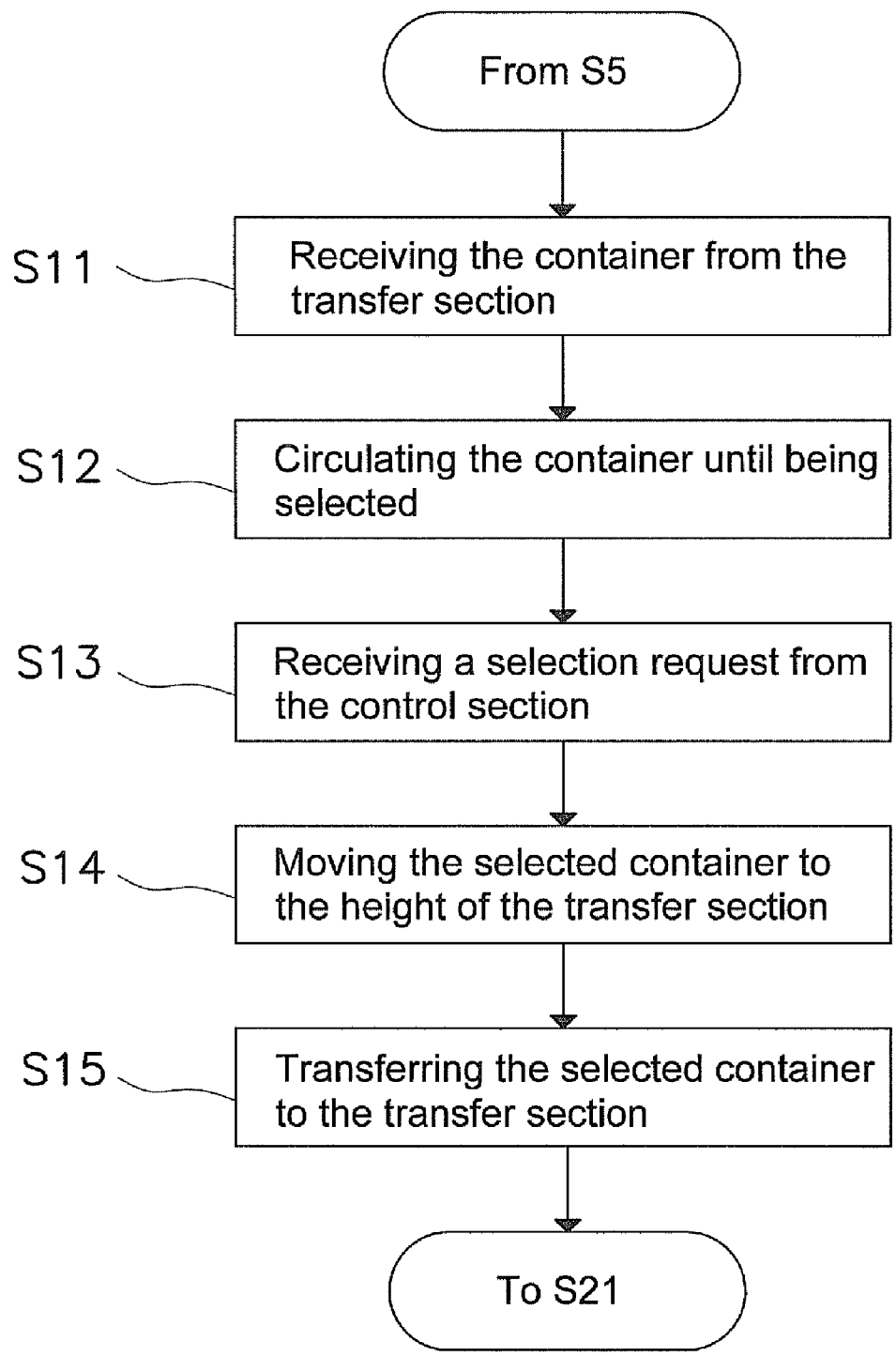
FIG. 14 is a flowchart showing the operation of the weighing device according to the present invention during a stock step.
Figure 15:
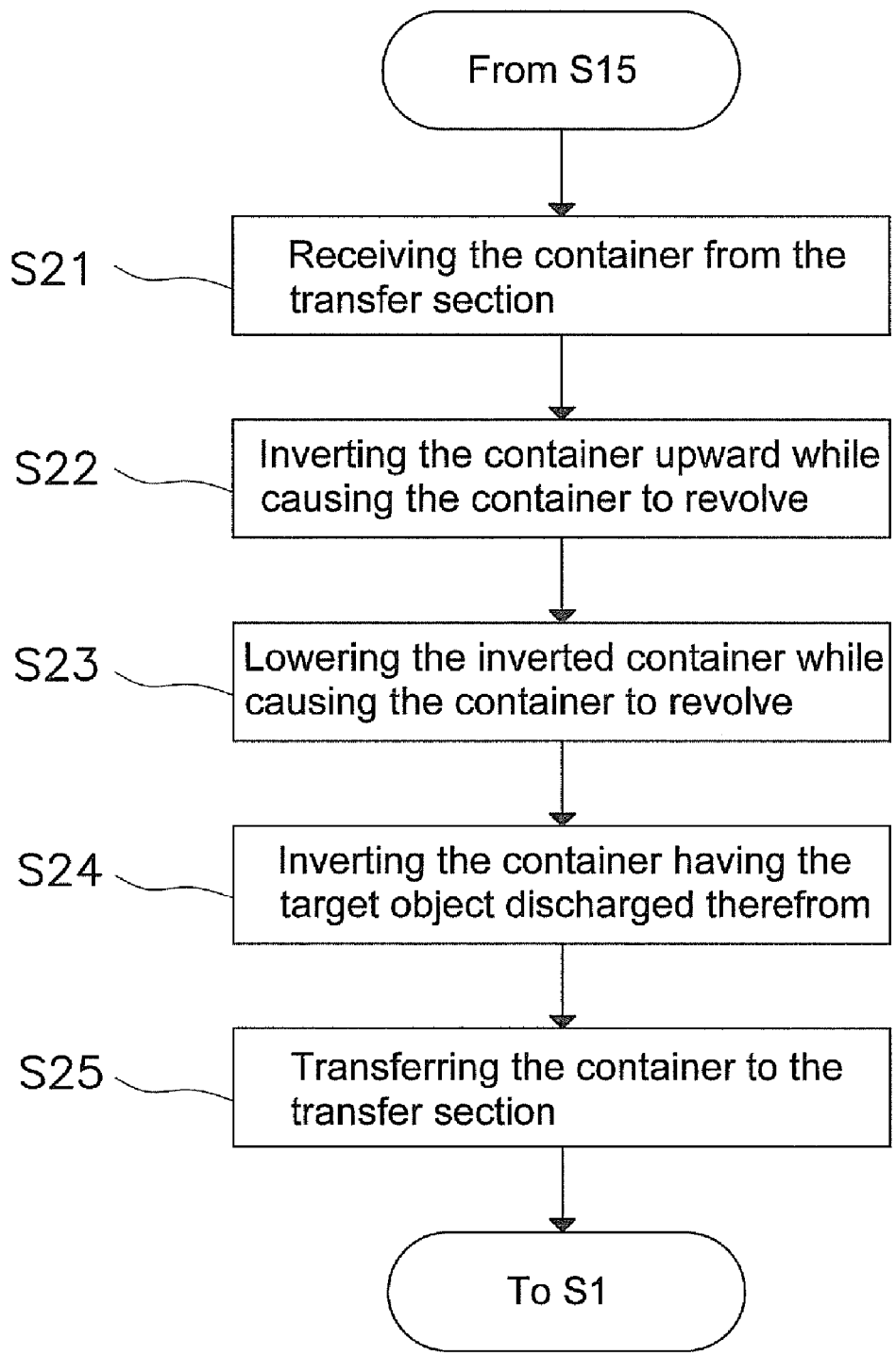
FIG. 15 is a flowchart showing the operation of the weighing device according to the present invention during a discharge step.

Hereinafter, with reference to flowcharts in FIG. 13 through FIG. 15, the flow of processing performed by the weighing device 10 in this embodiment having the above-described structure will be described. The steps performed in accordance with the flowcharts shown in FIG. 13 through FIG. 15 are in a control flow controlled by the control unit 20 (see FIG. 1).

First, with reference to the flowchart in FIG. 13, a step of supplying and weighing in the weighing unit 13 will be described.

In the weighing unit 13, in step (hereinafter, referred to simply as "S") 1, an empty container C is received from the transfer unit 16c. In S2, the empty container C is weighed before a target object is supplied by the supply unit 12. Next in S3, the supply unit 12 puts target objects sequentially to containers C which are revolved by the weighing unit 13. In S4, the weighing unit 13 weighs each container C containing a target object. By subtracting the weight result of the empty container C from the weight result of the container C containing the target object, the weight of the target object can be found. Finally in S5, the weighed container C is transferred to the transfer unit 16a. In the case where the container C received in S1 is not empty, the weight result in S2 is subtracted from the weight result in S4. Thus, the weight of the target object newly added to the container C is found. By adding the weight of the target object already in the container C to the weight of the newly added target object, the total weight of the target objects in the container C can be found as the weight result.

The weighing unit 13 sends the weight result to the control unit 20. The control unit 20 stores the received weight results on the target objects in a storage unit such as a ROM, a RAM or the like, and thus accumulates data for performing combination weighing.

Next, with reference to the flowchart in FIG. 14, a step of accumulating containers C in the stock unit 14 will be described.

In the stock unit 14, in S11, a weighed container C is received from the transfer unit 16a by the holder 31 in the accumulation unit 30. Next in S12, the container C is circulated (is placed into a wait state) in the stock unit 14 while being held in the accumulation unit 30 until the container C is selected by the control unit 20. When a selection request is received from the control unit 20 in S13, the selected container C is moved vertically in S14. As shown in FIG. 6, the selected container C is moved to the height corresponding to 5F at which the transfer unit 16b is located. Next in S15, the selected container C is transferred to the transfer unit 16b. The container C transferred to the transfer unit 16b is then processed in S21 shown in FIG. 15. Although not shown in the flowchart, in order to add a new container C from the weighing unit 13 to the position in the accumulation unit 30 at which the container C that was transferred had been held, the stock unit 14 causes the accumulation unit 30 to revolve around the rotation shaft A2 to the transfer unit 16a while keeping the accumulation unit 30 at the same height. Then, a new weighed container C is added from the transfer unit 16a to the position.

With the weighing device 10 in this embodiment, as shown in FIG. 6, the stock unit 14 receives and transfers containers C at the same height (at 5F in FIG. 6). Therefore, the operation from transferring a container C to receiving a new container C can be smoothly performed merely by causing the accumulation unit 30 to revolve. In the accumulation unit 30, the new container C is added at the position where the container C which was transferred had been held. Therefore, the container C can be added without moving the accumulation unit 30 vertically. Since the moving amount of the container C can be reduced, the impact or the like applied to the target object in the container C can be alleviated and thus the target object can be protected.

Finally, with reference to the flowchart shown in FIG. 15 and FIG. 10(a) through FIG. 10(f), a step of discharging a target object from the container C in the discharge unit 15 will be described.

Figure 10:
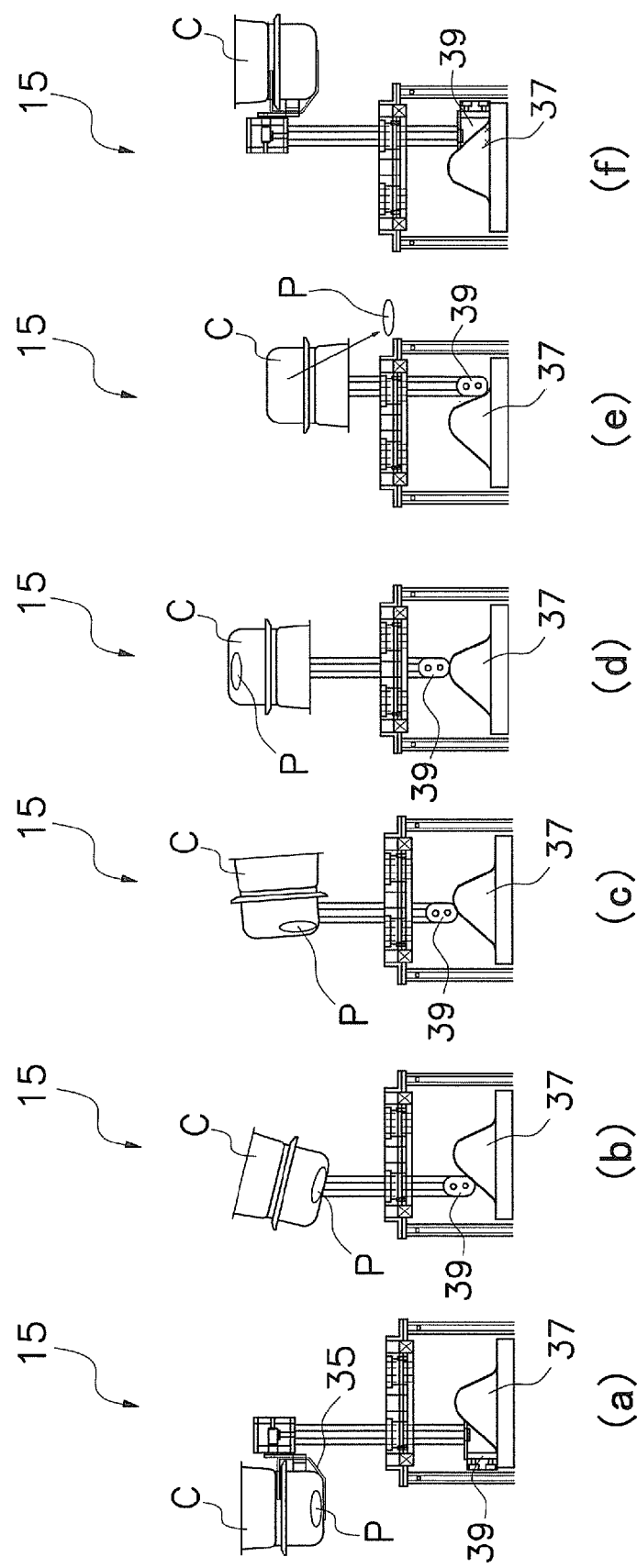
FIG. 10(*a*) through FIG. 10(*f*) show a discharge method carried out by the discharge unit shown in FIG. 8 and FIG. 9.

In the discharge unit 15, in S21, as shown in FIG. 10(a), the selected container C is received by the holder 35 from the transfer unit 16b. In S22, as shown in FIG. 10(b), the container C is elevated while revolving around the rotation shaft A3. When the container C starts to be elevated, the rotation of the container C is simultaneously started. The position of the container C on a plane at this point is the "container rotation start" position represented in FIG. 9 with a two-dot chain line. As shown in FIG. 10(c), the container C is further rotated while being elevated. As shown in FIG. 10(d), the container C is rotated at 180 degrees and inverted so as to be open downward before arriving the uppermost point. Next, in S23, as shown in FIG. 10(e), after the container C is inverted at 180 degrees, the container C is lowered in that state. The position of the container C on a plane at this point is the "final inverted container" downward position represented in FIG. 9 with another two-dot chain line. At this point, the target object is displaced from the revolving track of the container C in the discharge unit 15 and discharged toward the center or the vicinity thereof of the discharge chute 17 which is located in a tangential direction of the revolving track. The position of the container C on a plane at this point is the "discharge completion" position represented in FIG. 9 with yet another two-dot chain line. In S24, as shown in FIG. 10(f), the container C discharged the target object is rotated back at 180 degrees to be open upward. Finally in S25, the container C is transferred to the transfer unit 16c.

As described above, the container C revolves by a rotational drive force from the rotation motor M1 of the revolving mechanism 19 being transmitted to the rotation shafts A1 through A4. By contrast, the container C is elevated or lowered, i.e., moved vertically, by the guide unit 39 attached to the bottom of the shaft 36 moving along the inclining plate 37.

With the weighing device 10 in this embodiment, as described above, when the target object is discharged from the container C, the discharge unit 15 moves the container C vertically and also rotates the container C at 180 degrees. This can give a vertically upward inertial force to the target object. Therefore, even where a plurality of target objects are contained in the container C, the target objects are assembled together at the bottom of the container C. As a result, the target objects are prevented from being discharged immediately after the container C starts to be rotated and also prevented from being discharged sequentially.

With the weighing device 10 in this embodiment, the discharge unit 15 inverts the container C at 180 degrees, and then lowers the container C vertically. Usually, where a plurality of target objects, such as potato chips, are contained in the container C, when the container C is inverted to discharge the plurality of target objects, there is a delay between the time at which the first target object is discharged and the time at which the final target object is discharged. When this occurs, the target objects are discharged from the container C in the form of a lengthy strip, and the problem of so-called sequential discharge arises. With the weighing device 10 in this embodiment, the discharge unit 15 lowers the container C vertically after inverting the container C. This can gives a vertically downward force to the target objects which are to be discharged from the container C with delay among the plurality of target objects. Therefore, the delay between the time at which the first target object is discharged and the time at which the final target object is discharged is eliminated, which solves the problem of sequential discharge.

Features of the Weighing Device in this Embodiment (1) With the weighing device 10 in this embodiment, the steps of weighing, stocking and discharging are performed while containers C each containing a target object are constantly revolving.

Specifically, the supply unit 12 supplies a target object to the container C which is caused to revolve by the weighing unit 13. The weighing unit 13 weighs the container C while causing the container C to revolve. The stock unit 14 stocks a plurality of containers C while holding three-dimensionally and causing the plurality of containers C to revolve. The discharge unit 15 discharges the target object from the container C while causing the container C to revolve.

With a conventional weighing device, the above-described steps of weighing, stocking and discharging are performed in the state where the container C is stationary, and then the container C is moved to the next step. With a conventional system in which the container C is stopped in each step to perform each operation and then is moved again, the efficiency is lowered and there is a limit on expediting the process of weighing to discharging.

With the weighing device 10 in this embodiment, each step is performed while the containers C are constantly moving. Since each step is performed while the containers C are constantly moving toward the next step, the time required for the process of weighing to discharging of the target object can be significantly reduced to realize high speed driving.

(2) The weighing device 10 in this embodiment includes the transfer units 16a through 16c for transferring the containers C between the weighing unit 13 and the stock unit 14, between the stock unit 14 and the discharge unit 15, and between the discharge unit 15 and the weighing unit 13.

The transfer units 16a through 16c rotate at the same speed in the opposite direction to the weighing unit 13, the stock unit 14 and the discharge unit 15, which rotate in the same direction in synchronization. Therefore, the container C can be smoothly transferred between the units.

In the vicinity of the transfer units 16a through 16c, the claw member 45 is provided for guiding a container C revolving in each unit to be off the revolving track. Thus, by merely putting the revolving container C into contact with the claw member 45, the container C can be released from the held state and transferred to each of the transfer units 16a through 16c. Even when the container C is held by a permanent magnet, the container C can be forcibly released by the claw member 45.

(3) With the weighing device 10 in this embodiment, five weighing members 25a through 25e in the weighing unit 13 weigh the container C and the target object therein while revolving together with the container C.

Thus, the container C can be weighed in the weighing unit 13 while moving.

The container C and each of the weighing members 25a through 25e are stationary with respect to each other. Therefore, even though the container C is revolving, the weighing can be accurately performed in the same way as when the container C is stationary.

In the case where the weighing unit 13 includes a plurality of weighing members 25a through 25e as in this embodiment, a plurality of containers C can be weighed substantially simultaneously. Therefore, a great number of containers C can be weighed efficiently.

(4) The weighing device 10 in this embodiment holds containers C in the stock unit 14 three-dimensionally.

By moving a plurality of containers C circulating in the weighing device 10 vertically as well as horizontally, the weighing device can save space.

(5) The weighing device 10 in this embodiment continuously moves a plurality of containers C.

Thus, the weighing device 10 can accumulate a plurality of continuously weighed containers C in the stock unit 14, and also can continuously retrieve desired containers C from the stock unit 14 and discharge the target objects from the containers C. As a result, the entire process performed by the device can be expedited.

(6) With the weighing method in this embodiment, as described above, the steps of supplying, weighing, stocking and discharging a target object are performed while the container C is moving.

Therefore, as compared with the conventional case where the steps are performed while the container C is stationary, the time required for the process of supplying to discharging can be reduced in order to achieve high speed processing.

(7) With the weighing device 10 in this embodiment, as shown in FIG. 6 and FIG. 7, the containers C are circulated in the stock unit 14.

With a conventional weighing device, the containers C are once stopped and accumulated in the stock unit, and then a selected container C is moved again and transferred to a discharge unit. Such a structure requires the container C once stopped to be moved again, which is poor in efficiency and is not suitable to expedite the processing in a weighing device.

With the weighing device 10 in this embodiment, the stock unit 14 accumulates a plurality of containers C while constantly moving the containers C. Therefore, a container C selected from the plurality of containers C accumulated in the stock unit 14 can be smoothly transferred toward the discharge unit 15. Thus, as compared with a conventional weighing device for accumulating the containers C in a stationary state in the stock unit, the time required for the process of the selection of the container C to transfer thereof toward the discharge unit 15 can be reduced to realize high speed processing.

(8) With the weighing device 10 in this embodiment, a new container C is added in the stock unit 14 which accumulates a plurality of containers C, at a position in the accumulation unit 30 at which the container C which was transferred toward the discharge unit 15 immediately before was held.

With a conventional weighing device, in the case where, for example, a plurality of containers are accumulated two-dimensionally, a new container C is added from a fixed position and the other containers are moved one by one to fill the position where the container which was transferred had been held. Such a system requires the non-selected containers to move each time a new container is added. This imposes an unnecessary load on the target objects in the containers.

With the weighing device 10 in this embodiment, a new container C is added to a position in the accumulation unit 30 at which the container C which was transferred immediately before thereof had been held. Thus, the new container C can be added without moving the non-selected containers after the container is transferred until the new container is added. As a result the target objects in the non-selected containers C do not need to be moved due to the addition of the new container and are prevented from receiving an unnecessary load. This can protect the target objects.

Embodiment 2

Another embodiment according to the present invention will be described with reference to FIG. 16 and FIG. 17.

A combination weighing device 60 according to this embodiment separately provides objects such as food items or industrial products to a plurality of containers each having a top opening, selects containers such that the total weight of the target objects contained in the selected containers is within a predetermined weight range, and discharges a plurality of objects within the predetermined weight range.

Figure 16:
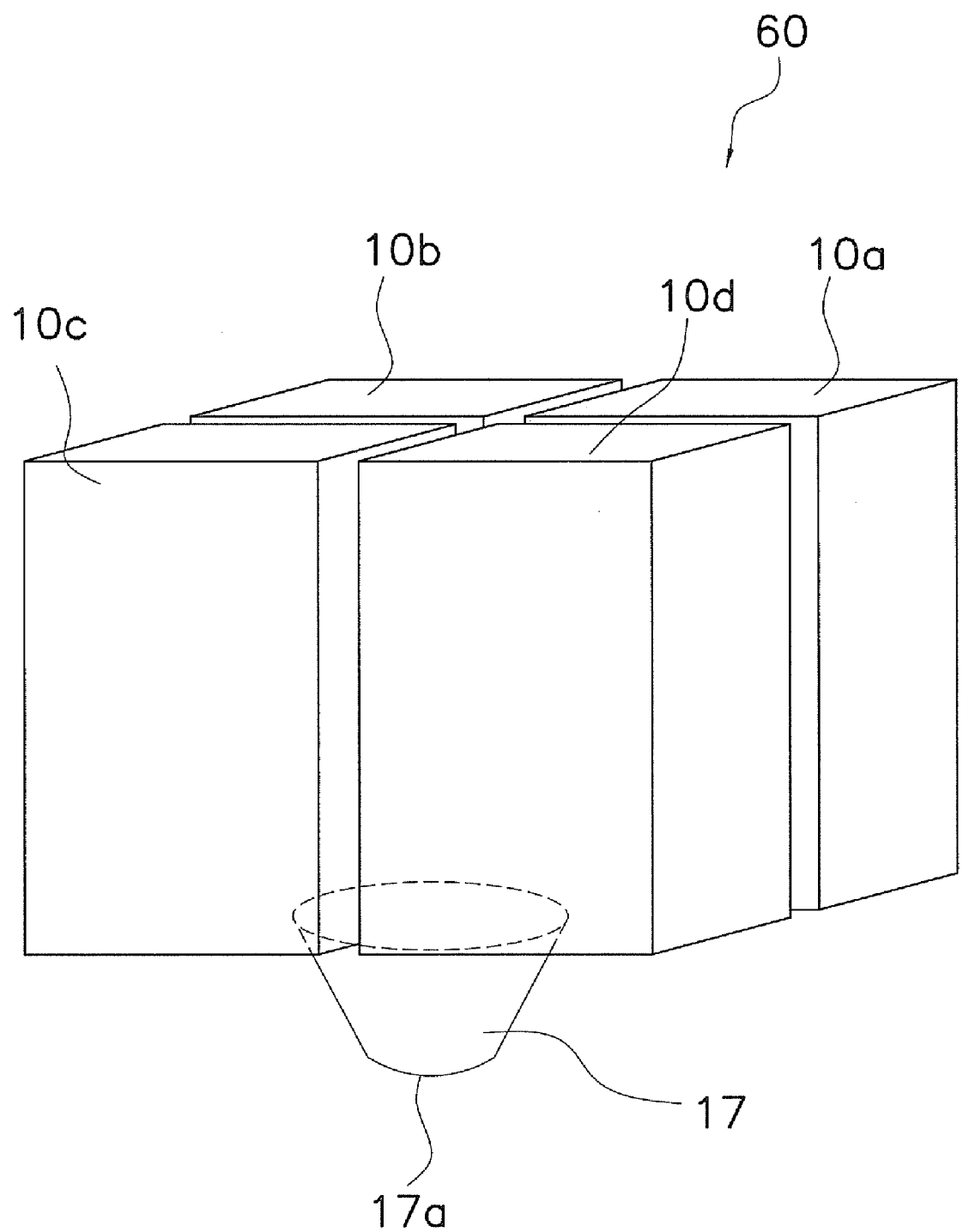
FIG. 16 is an perspective view of a combination weighing device according to one embodiment of the present invention.

As shown in FIG. 16, the combination weighing device 60 includes four weighing devices 10 according to Embodiment 1 and a discharge chute 17.

The combination weighing device 60 includes a control unit 20 connected to the four weighing devices 10. The control unit 20 is included in one of the four weighing devices 10.

The control unit 20 receives data on a weight of a target object, which is weighed in the weighing unit 13 each of the four weighing devices 10 and accumulated in the stock unit 14, from the weighing unit 13. The control unit 20 combines target objects accumulated in the state of being contained in the containers C in the stock unit 14 of each of the four weighing devices 10, such that the total weight of the combined target objects is within a desired weight. When the control unit 20 determines a combination to realize a desired weight, the containers C containing the target objects used for the combination are selected from the weighing device 10 and retrieved from the stock units 14. Then, the desired target objects are discharged from the containers C in the discharge units 15 and thrown into the discharge chute 17.

Figure 17:
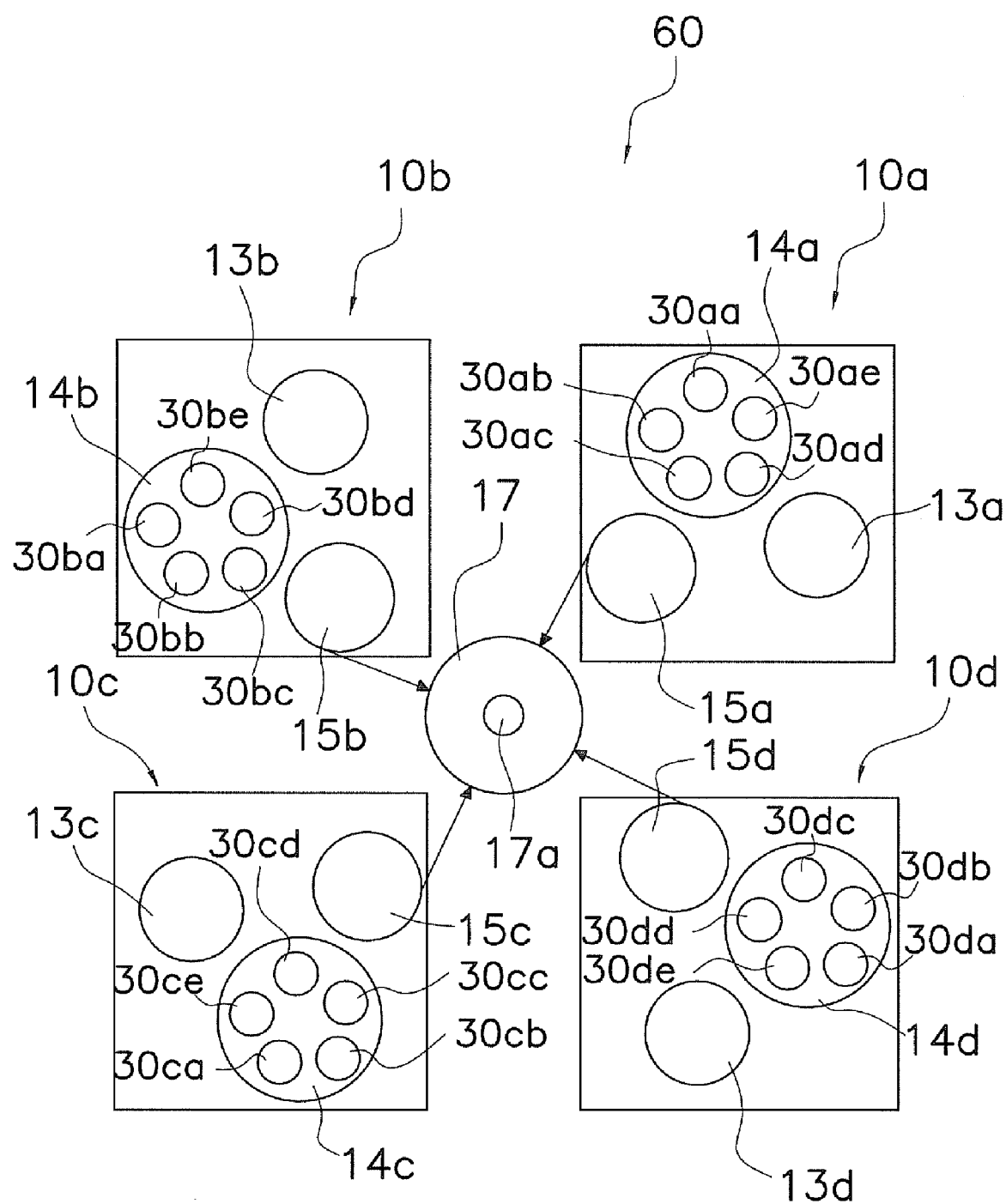
FIG. 17 is a plan view showing a combination weighing operation by the combination weighing device shown in FIG. 16.

As shown in FIG. 17, combination weighing by the combination weighing device 60 in this embodiment is performed in the state where four weighing devices 10a through 10d are located so as to surround the discharge chute 17.

The weighing devices 10a through 10d respectively include weighing units 13a through 13d, stock units 14a through 14d, and discharge units 15a through 15d as described in Embodiment 1. The stock units 14a through 14d each include five accumulation units 30aa through 30de. The five accumulation units each hold five containers C vertically as described above.

In the combination weighing device 60 in this embodiment, the control unit 20 included in the weighing device 10 in Embodiment 1 is included only in the weighing device 10a. This control unit 20 controls the operation of the four weighing devices 10. Namely, the control unit 20 in the weighing device 10a combines the weights of the target objects which are contained in the plurality of containers C accumulated in the stock units 14a through 14d in the four weighing devices 10a through 10d. Target objects are discharged from three or four among the weighing devices 10a through 10d toward the bottom opening 17a of the discharge chute 17, such that the total weight of the discharged target objects is within a desired weight range.

With the combination weighing device 60 including the four weighing devices 10a through 10d as described above, containers C containing the target objects having a desired weight among the five containers C held vertically in, for example, the accumulation unit 30ac in the stock unit 14a of the weighing device 10a are transferred to the discharge unit 15a.

Concurrently, in the other weighing devices 10b through 10d, containers C containing the target objects having a desired weight for the combination weighing, among the five containers C held in each of the accumulation units 30bc through 30dc in the stock units 14b through 14d, are similarly transferred to the discharge units 15b through 15d.

Then, in the weighing devices 10a through 10d, combination weighing is performed using five containers C held in the four accumulation units 30ad through 30dd in the stock units 14a through 14d, i.e., 20 containers C.

After this, combination weighing is similarly performed using 20 items of weight data in the accumulation units 30ae through 30de, 30aa through 30da, and 30ab through 30db.

With the weighing device 60 in this embodiment, as described above, in the accumulation units 30aa through 30de included in the stock units 14a through 14d, combination weighing is performed using the accumulation units 30aa, 30ba, 30ca and 30da as one group, the accumulation units 30ab, 30bb, 30cb and 30db as one group, the accumulation units 30ac, 30bc, 30cc and 30dc as one group, the accumulation units 30da, 30db, 30dc and 30dd as one group, and the accumulation units 30ae, 30be, 30ce and 30de as one group.

In the case where, for example, combination weighing is performed by discharging the target objects only from the three weighing devices 10a through 10c among the four weighing devices 10a through 10d, the containers C are not inverted in the discharge unit 15d in the weighing device 10d in which no target object is discharged.

Combination weighing, which is performed using a plurality of containers C held in the accumulation units 30 in the stock units 14a through 14d, can be performed continuously with no need to wait for each of the stock units 14a through 14d to rotate once.

The target objects may be discharged from each of the four weighing devices 10. Alternatively, in the case where one weighing device 10 includes containers C containing target objects of a desired weight range, the target objects may be discharged from one such weighing device 10.

Thus, target objects within a desired weight range can be discharged. By combining four weighing devices 10 in Embodiment 1 in this manner, high speed processing of, for example, 240 times per minute, will be achieved.

Features of the Combination Weighing Device in this Embodiment (1) The combination weighing device 60 in this embodiment includes a combination of four weighing devices 10 in Embodiment 1.

With the weighing device 10 in Embodiment 1, as described above, the steps of supplying, weighing, stocking and discharging are performed while the containers C are moving. This achieves high speed processing from weighing to discharging, like with the weighing device 10 in Embodiment 1. By performing combination weighing using four such weighing devices 10 capable of performing high speed processing, processing of 240 times per minute at the maximum will be achieved.

The combination weighing device 60 in this embodiment provides all the effects achieved by the above-described structure of the weighing device 10.

(2) The combination weighing device 60 in this embodiment includes a combination of four weighing devices 10 in Embodiment 1.

With the weighing device 10 in Embodiment 1, as described above, a plurality of containers C are circulated in the stock unit 14. This achieves high speed processing from stocking to discharging, like with the weighing device 10 in Embodiment 1. By performing combination weighing using four weighing devices 10 capable of performing such high speed processing, processing of 240 times per minute at the maximum will be achieved.

(3) The combination weighing device 60 in this embodiment includes a combination of four weighing devices 10 in Embodiment 1.

With the weighing device 10 in Embodiment 1, as described above, a new container C is added in the stock unit 14 which accumulates a plurality of containers C, at a position in the accumulation unit 30 at which the container C which was transferred toward the discharge unit 15 immediately before thereof had been held. This can expedite the process of discharging to adding in the stock unit 14, like the with the weighing device 10 in Embodiment 1. By performing combination weighing using four weighing devices 10 capable of performing such high speed processing, processing of 240 times per minute at the maximum will be achieved.

Embodiment 3

Structure

Overall Structure

Figure 18:
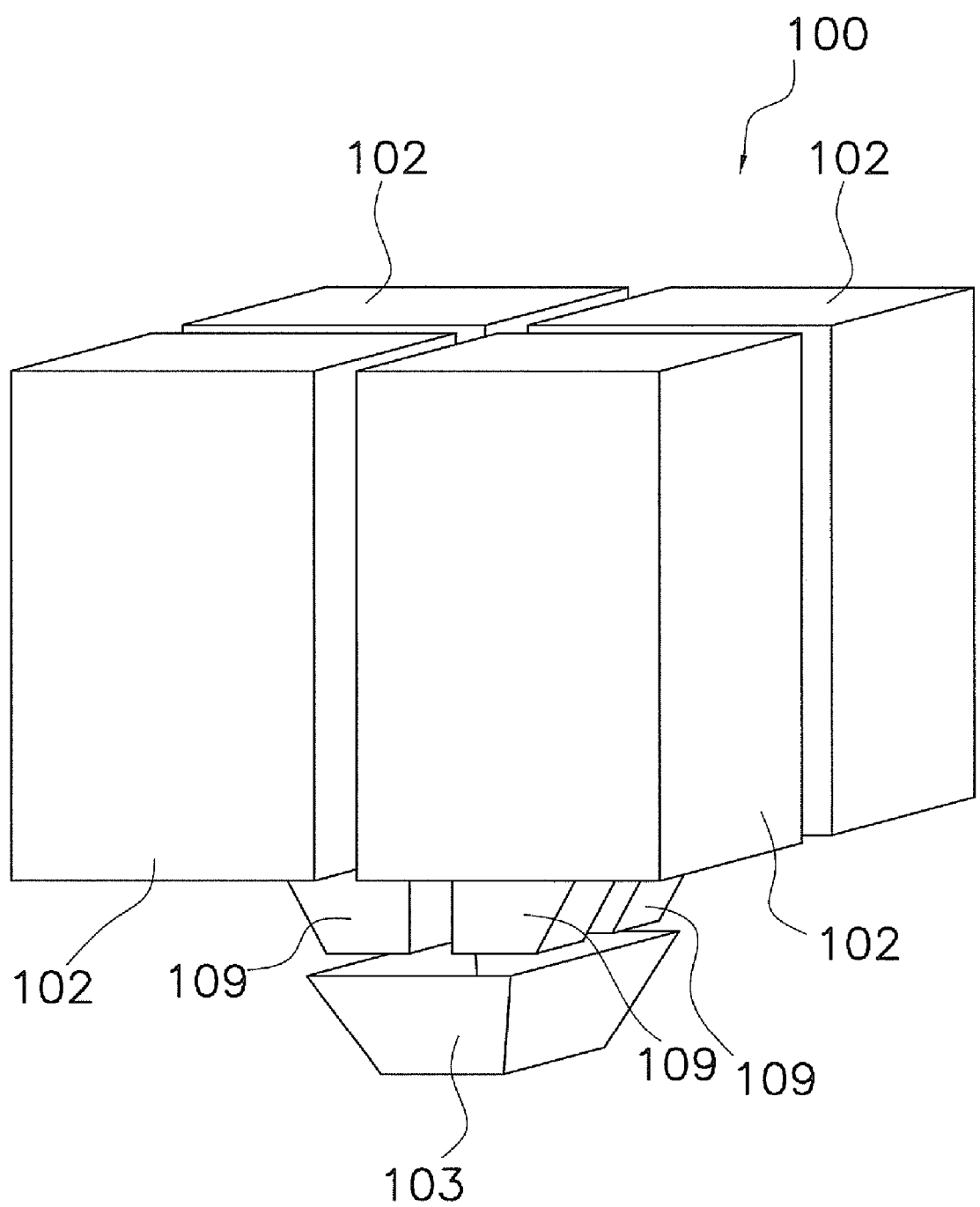
FIG. 18 is a schematic view of a combination weighing system.

A combination weighing system 100 adopting yet another embodiment according to the present invention is schematically shown in FIG. 18.

The combination weighing system 100 separately provides objects such as food items or industrial products to a plurality of containers each having a top opening, selects containers such that the total weight of the objects contained in the containers is within a predetermined weight range, and discharges a plurality of objects within the predetermined weight range.

The combination weighing system 100 includes four combination weighing devices 102 and a collective chute 103. The combination weighing devices 102 are located in a horizontal plane in a 2×2 arrangement, such that discharge chutes 109 respectively provided in bottom parts of the combination weighing devices 102 are close to one another. The collective chute 103 is located below the discharge chutes 109 and collects objects discharged from the combination weighing devices 102.

Combination Weighing Device 102

Figure 19:
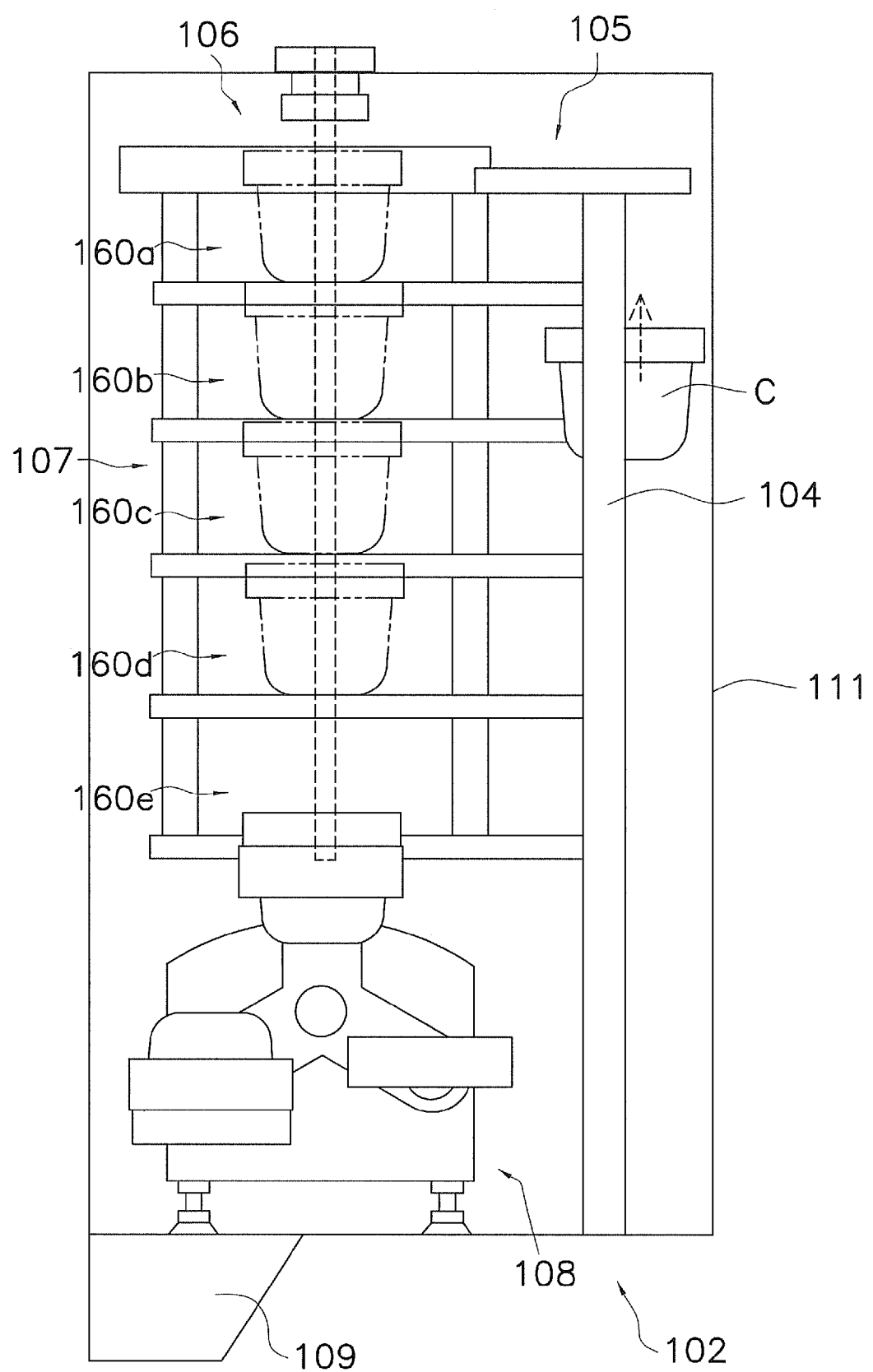
FIG. 19 is a front view of the combination weighing device.
Figure 20:
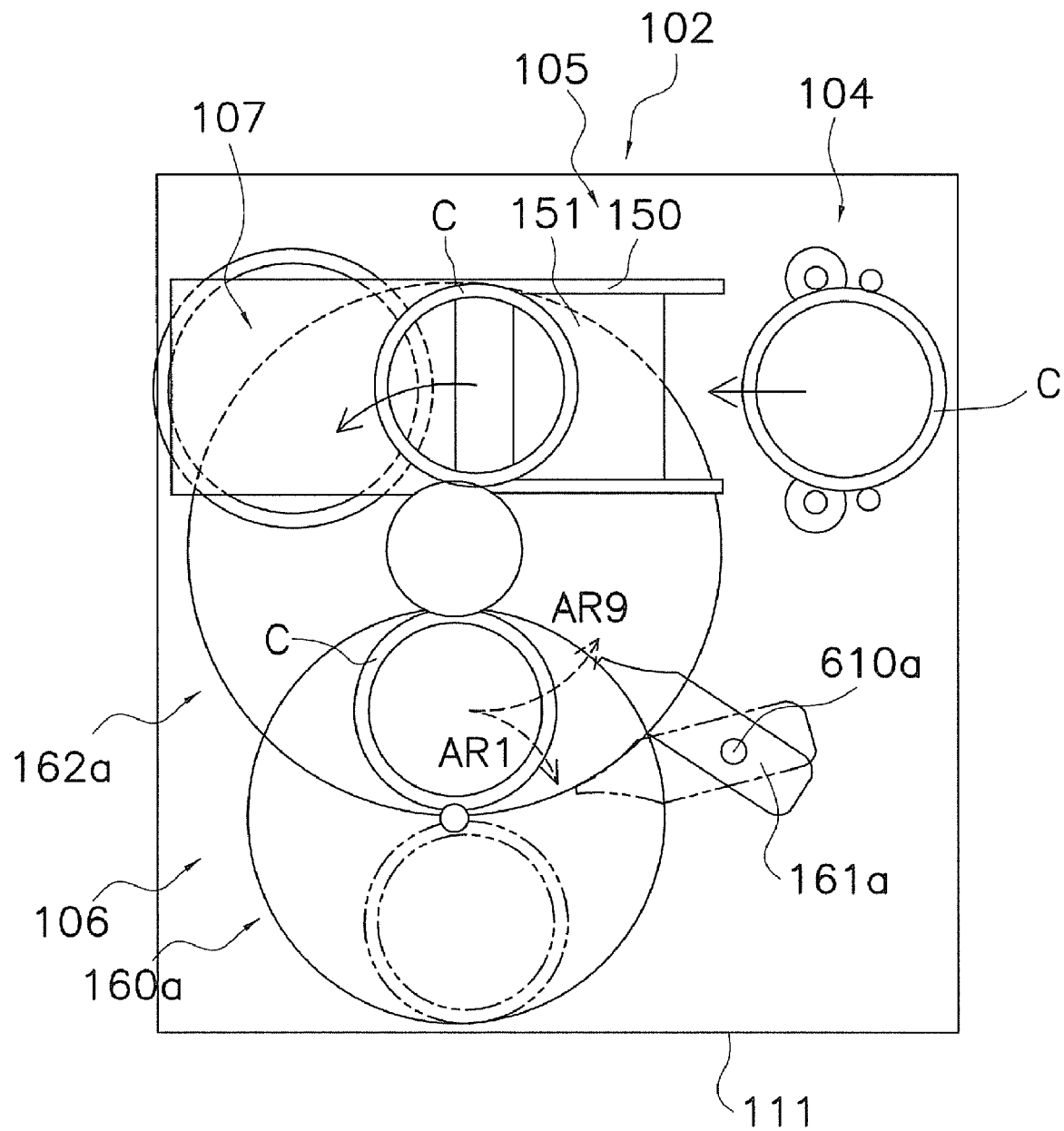
FIG. 20 is a top view of the combination weighing device.

A schematic view of each combination weighing device 102 is shown in FIG. 19 and FIG. 20. FIG. 19 is a front view of the combination weighing device 102, and FIG. 20 is a top view thereof.

The combination weighing device 102 mainly includes a lift 104, a weighing unit 105, a stock unit 106, a discharge unit 107, a transportation device 108, a discharge chute 109, a control unit 110 (see FIG. 25), and a frame 111 for supporting these elements.

The lift 104 is provided from a lower position to an upper position of the combination weighing device 102, and transports an empty container C discharged from the transportation device 108 to the weighing unit 105 of the combination weighing device 102.

The weighing unit 105 weighs an object in the container C, and is provided between the lift 104 and the stock unit 106. As shown in FIG. 20, the weighing unit 105 mainly includes a guide 150 and a weight sensor 151. The guide 150 is a linear member arranged horizontally, and forms a path for guiding a container C from the lift 104 to the stock unit 106. The weight sensor 151 is provided in the middle of the path formed by the guide 150, and weighs the container C passing through the path. The weighing unit 105 sends weighing data obtained by the weight sensor 151 to the control unit 110.

The stock unit 106 stocks containers C which contain target objects weighed by the weighing unit 105, and is arranged from a lower position to an upper position of the combination weighing device 102. As shown in FIG. 19, the stock unit 106 is vertically divided into five layers 160a, 160b, 160c, 160d and 160e. In FIG. 20, only the top layer 160a of the stock unit 106 is shown, but the other layers 160b, 160c, 160d and 160e have substantially the same structure. Hereinafter, with reference to FIG. 20, the top layer 160a of the stock unit 106 will be described.

The top layer 160a of the stock unit 106 forms a ring-shaped path in a horizontal plane. The containers C to be stocked can be circulated through the ring-shaped path. A ring-shaped transportation path 162a is provided between the top layer 160a of the stock unit 106 and the weighing unit 105. The transportation path 162a is provided so as to partially overlap the weighing unit 105 and the top layer 160a of the stock unit 106. A container C which has passed through the weighing unit 105 is transferred to the transportation path 162a and then to the top layer 160a of the stock unit 106. In the vicinity of the overlapping portion of the top layer 160a of the stock unit 106 and the transportation path 162a, a selection lever 161a is provided. The selection lever 161a is a lever-like member supported to be pivotable around a rotation shaft 610a. The selection lever 161a projects into the vicinity of the overlapping portion of the top layer 160a and the transportation path 162a and thus can change the moving direction of the container C. Namely, the selection lever 161a can change the moving direction of a container C moving on the transportation path 162a so as to discharge the container C in a tangential direction of the transportation path 162a to the top layer 160a of the stock unit 106 (see, in FIG. 20, the selection lever 161a represented with the solid line and dashed arrow AR1). The selection lever 161a can also change the moving direction of a container C revolving in the top layer 160a to discharge the container C in a tangential direction of the rotation to the discharge unit 107 (see, in FIG. 20, the selection lever 161a represented with the two-dot chain line and dashed arrow AR9).

The stock unit 106 has a drive unit (not shown) for driving the top layer 160a and the transportation path 162a. Containers C stocked in the stock unit 106 are circulated in the top layer 160a by the drive unit and stocked while revolving (see dashed arrow AR1 in FIG. 20). The stock unit 106 operates the selection lever 161a to transfer the containers C selected by combination calculation to the discharge unit 107. A container C is stocked in the each of the layers 160a, 160b, 160c, 160d and 160e stacked vertically, and a maximum of five containers C can be accumulated vertically.

The discharge unit 107 is a path provided vertically from an upper position to a lower position of the combination weighing device 102, and transfers a container C discharged from the stock unit 106 to the transportation device 108. The container C discharged from the stock unit 106 is freely dropped in the discharge unit 107 and changes the moving direction horizontally by a guide (not shown) to be transferred to the transportation device 108.

The transportation device 108 is provided in a bottom part of the combination weighing device 102, and transports an object supplied in the state of being contained in the container C, which is discharged from the discharge unit 107, to the discharge chute 109. The transportation device 108 will be described below in detail.

The discharge chute 109 is a box-like member having a top opening and a bottom opening, and discharges an object transported from the transportation device 108 to the collective chute 103 provided below the combination weighing device 102. The discharge chute 109 is provided below the transportation device 108 and in the vicinity of a side end of the frame 111.

Structure of the Transportation Device 108

Figure 21:
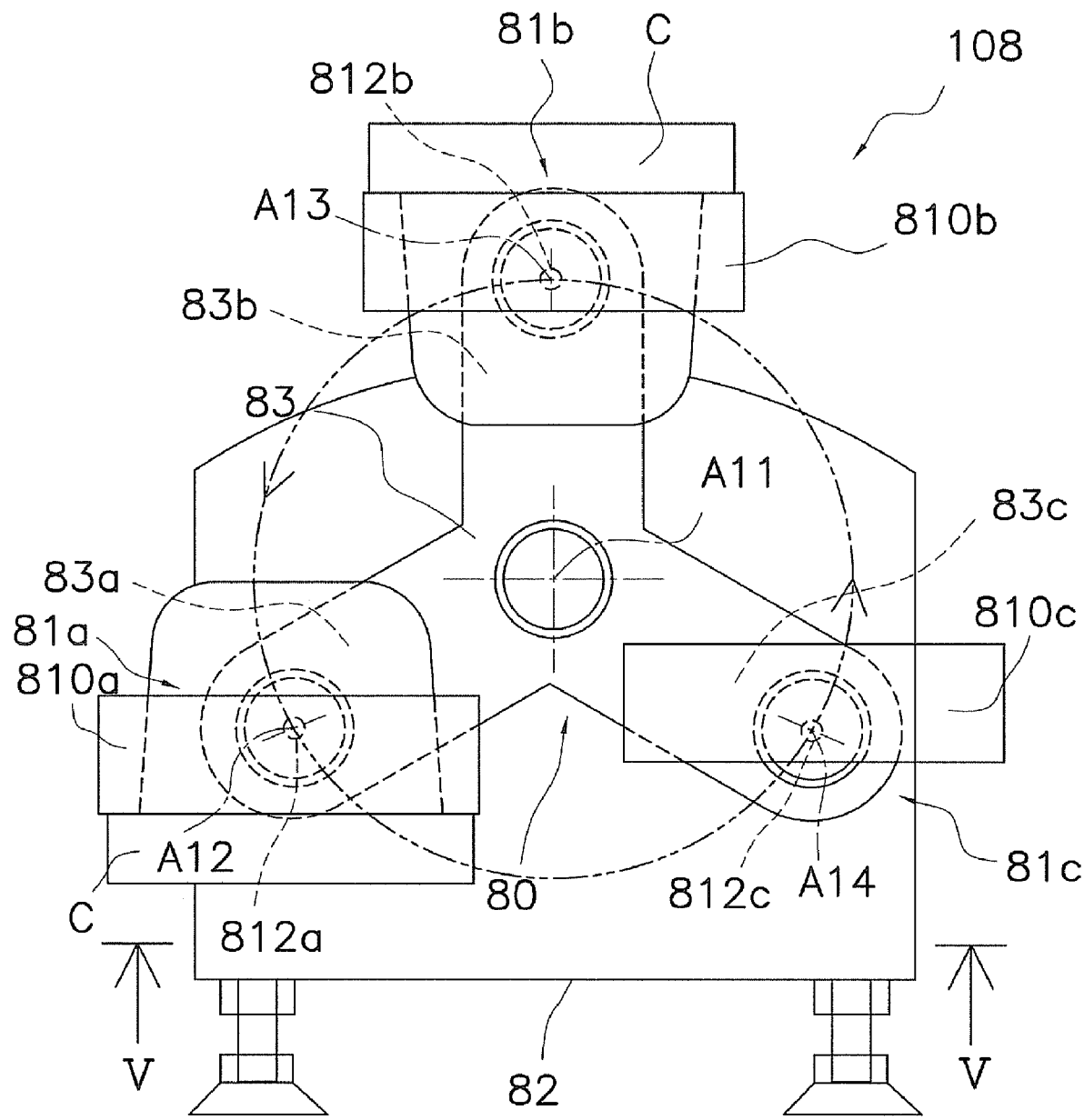
FIG. 21 is a front view of a transportation device.

The transportation device 108 transports a supplied object to the discharge chute 109 below. As shown in FIG. 21, the transportation device 108 includes a revolving mechanism 80, revolving mechanisms 81a, 81b and 81c, and a housing 82.

Revolving Mechanism

Figure 22:
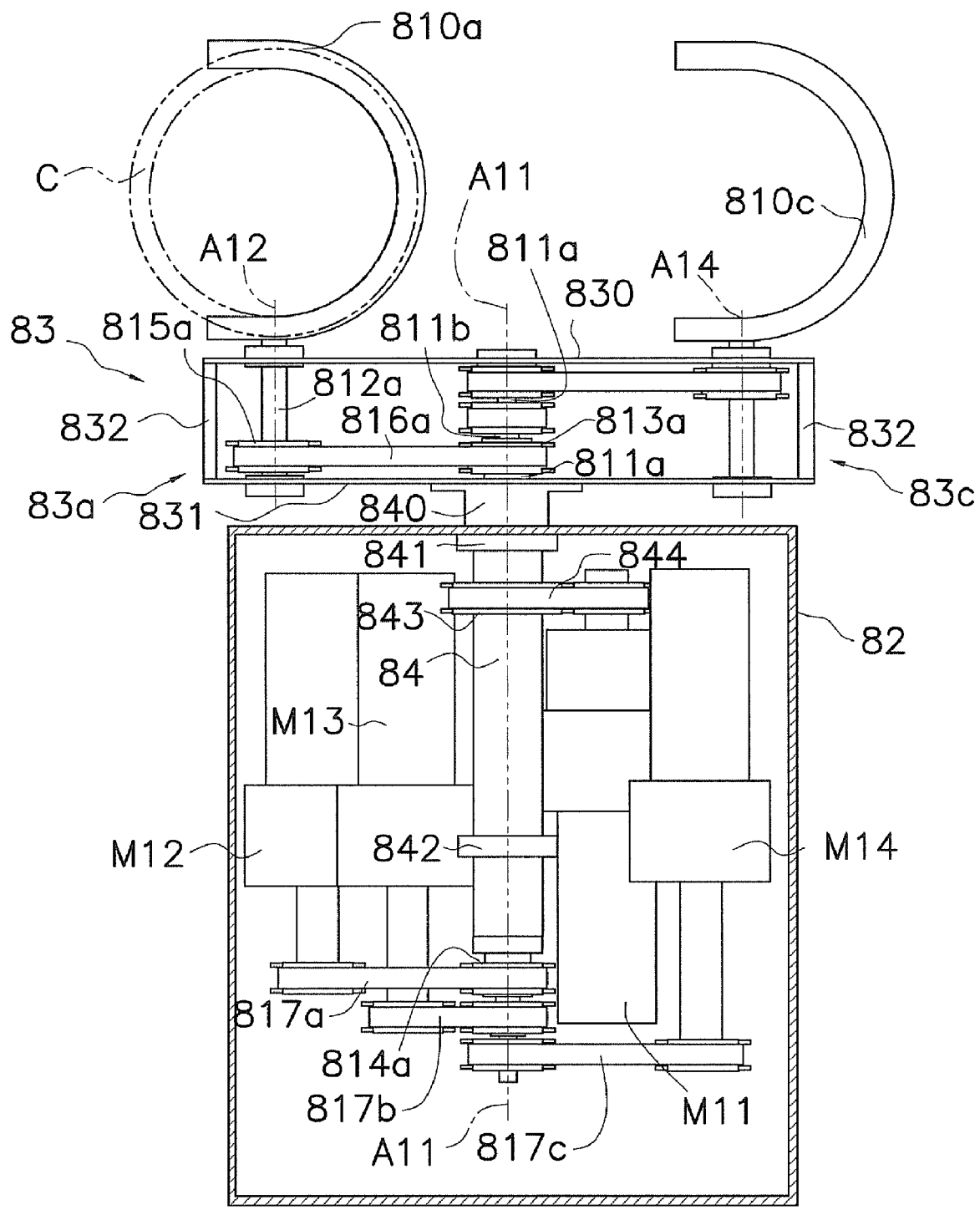
FIG. 22 is a top view of the transportation device.

The revolving mechanism 80 causes a container C containing an object to revolve around a revolving axis A11 in a vertical plane. As shown in FIG. 22, the revolving mechanism 80 mainly includes a revolving member 83, a revolving shaft 84 and a revolving motor M11.

As shown in FIG. 21, the revolving member 83 includes three arm members 83a, 83b and 83c radially extending from the revolving axis A11. The arm members 83a, 83b and 83c are provided at an equal angle of 120 degrees around the revolving axis A11.

As shown in FIG. 22, the revolving member 83 is formed by fixing two metal plates 830 and 831 provided parallel to face each other using a plurality of rod-like support members 832. In a space between the metal plates 830 and 831, a part of the elements of the revolving mechanisms 81a, 81b and 81c is provided, including a pulley, a second shaft and a belt for transmitting rotation described below.

The revolving shaft 84 is a hollow rod-like member, and is provided such that an end 840 thereof projects outside from a side surface of the housing 82. At the end 840 of the revolving shaft 84, the revolving member 83 is fixed vertically to the revolving axis A11 of the revolving shaft 84. The revolving shaft 84 is supported on the side surface of the housing 82 and inside the housing 82 by bearings 841 and 842, respectively, so as to be rotatable around an axis thereof. At a generally middle part of an outer circumferential surface of the revolving shaft 84, a pulley 843 is provided coaxially with the revolving shaft 84.

The revolving motor M11 is accommodated inside the housing 82, and transmits a rotation thereof to pulley 843 of the revolving shaft 84 via a belt 844 to rotate the revolving shaft 84.

Revolving Mechanisms

The revolving mechanisms 81a, 81b and 81c rotate a container C containing an object. As shown in FIG. 21, the first rotation unit 81a, the second rotation unit 81b and the third rotation unit 81c are provided in correspondence with the arm members 83a, 83b and 83c of the revolving member 83. As shown in FIG. 21 and FIG. 22, the rotation units 81a, 81b and 81c respectively include holders 810a, 810b and 810c, first shafts 811a, 811b and 811c, second shafts 812a, 812b and 812c, and rotation motors M12, M13 and M14.

The holders 810a, 810b and 810c each receive a container C containing an object, which is to be supplied to the transportation device 108, and support the container C. As shown in FIG. 21, the holders 810a, 810b and 810c are respectively located in the vicinity of tips of the arm members 83a, 83b and 83c. The holders 810a, 810b and 810c are each formed of bending a strip-like metal plate into a U shape and are respectively attached to the arm members 83a, 83b and 83c so as to be rotatable around rotation axes A12, A13 and A14 in a vertical plane.

Figure 23:
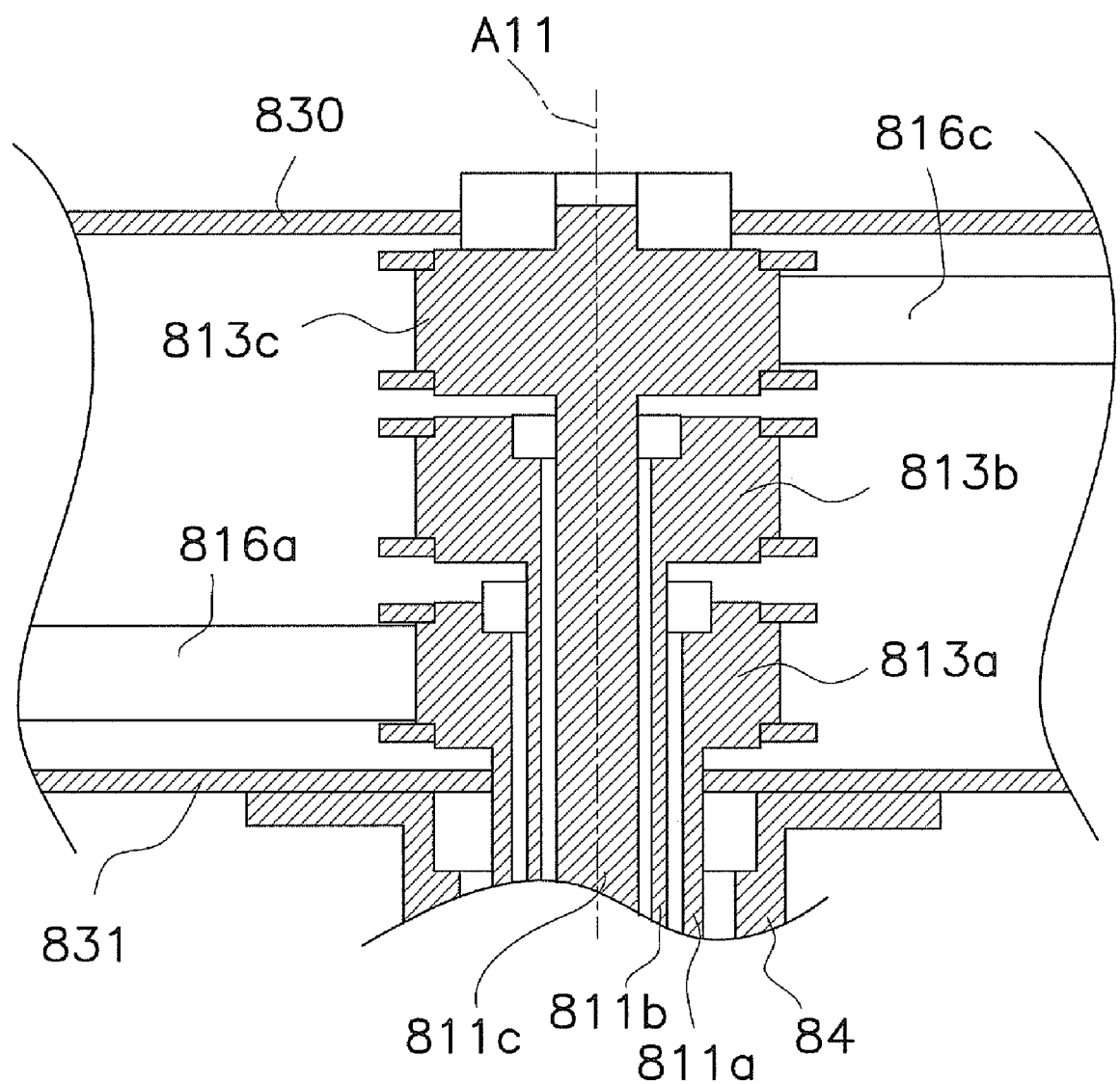
FIG. 23 is a cross-sectional view of one end of a revolving shaft and first shafts.
Figure 24:
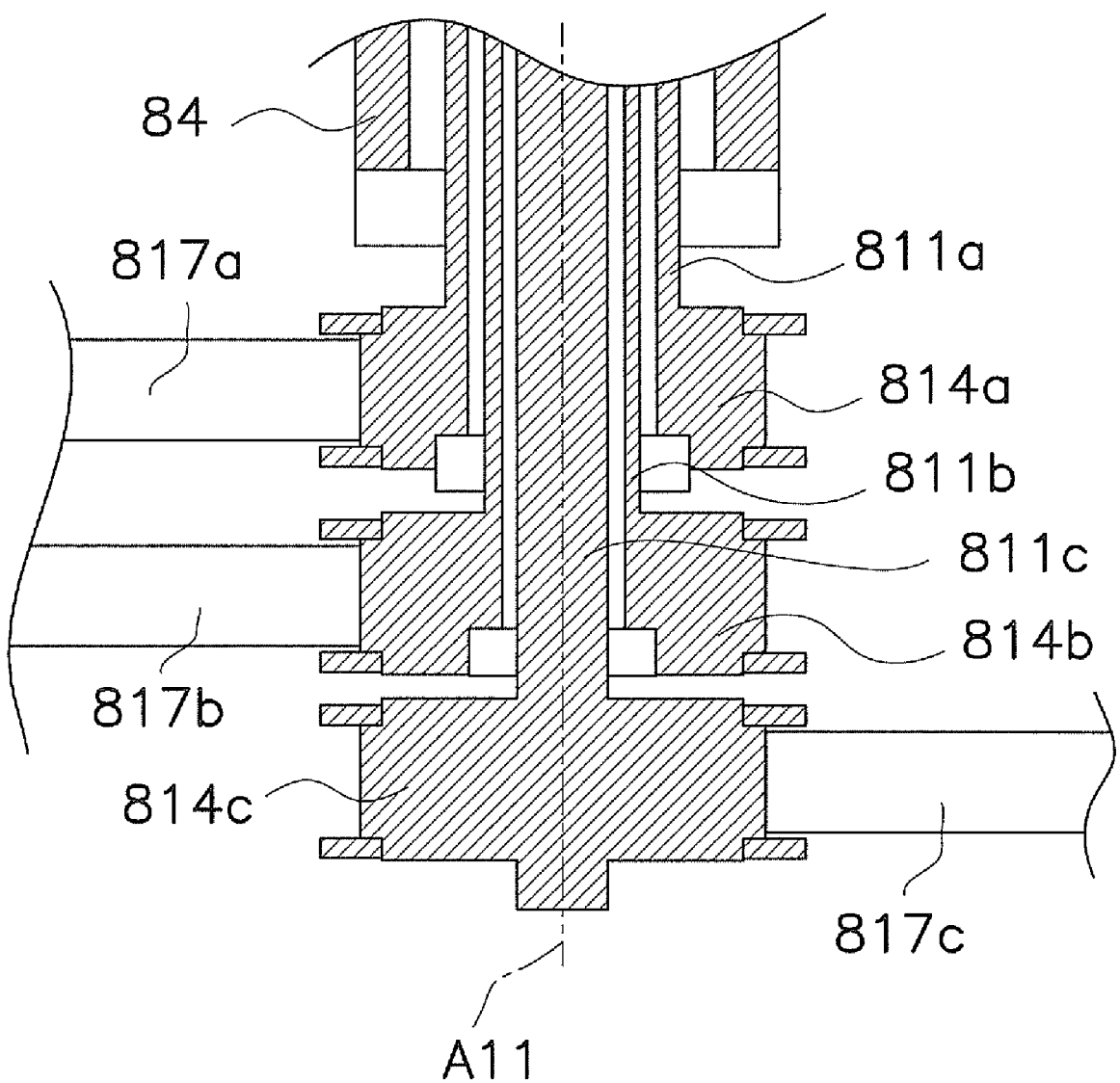
FIG. 24 is a cross-sectional view of the other end of a revolving shaft and first shafts.

The first shaft 811a of the first rotation unit 81a is a hollow rod-like member inserted into a hollow portion of the revolving shaft 84 (see FIG. 23 and FIG. 24). An end of the first shaft 811a projects from the end 840 of the revolving shaft 84 into the space interposed between the metal plates 830 and 831 of the revolving member 83, and a pulley 813a is fixed to an outer circumferential surface at a tip thereof. The other, lower end of the first shaft 811a projects from the other end of the revolving shaft 84 inside the housing 82, and a pulley 814a is fixed to an outer circumferential surface at a tip thereof.

The second shaft 812a is inserted into a bearing provided in the vicinity of the tip of the arm member 83a, and is provided parallel to the first shaft 811a. The second shaft 812a is supported to be rotatable around an axis thereof with respect to the revolving member 83. An end of the second shaft 812a projects from the arm member 83a, and the holder 810a is fixed to a tip thereof. At a generally middle part of an outer circumferential surface of the second shaft 812a, a pulley 815a is fixed.

The rotation motor M12 is provided inside the housing 82, and transmits a rotation thereof to the pulley 814a at the lower end of the first shaft 811a via a belt 817a so as to rotate the first shaft 811a.

As shown in FIG. 23 and FIG. 24, the first shaft 811b of the second rotation unit 81b is inserted into a hollow portion of the first shaft 811a of the first rotation unit 81a. The first shaft 811c of the third rotation unit 81c is inserted into a hollow portion of the first shaft 811b of the second rotation unit 81b. FIG. 23 is a cross-sectional view of one end of each of the ends of the revolving shaft 84 and the first shafts 811a, 811b and 811c which are projecting from the housing 82. FIG. 23 is taken along a plane including the revolving axis A11 of the revolving shaft 84. FIG. 24 is a cross-sectional view of the other, lower ends of the revolving shaft 84 and the first shafts 811a, 811b and 811c which are located inside the housing 82. As shown in FIG. 24, pulleys 814a, 814b and 814c are respectively provided to tips of the first shafts 811a, 811b and 811c. The rotation of the rotation motors M12, M13 and M14 is transmitted to the first shafts 811a, 811b and 811c via belts 817a, 817b and 817c. As shown in FIG. 23, pulleys 813a, 813b and 813c are respectively provided to tips of the first shafts 811a, 811b and 811c projecting outside the housing 82. A rotation of the first shafts 811a, 811b and 811c is transmitted to the respective second shafts 812a, 812b and 812c via belts 816a and 816c. A belt of the second rotation unit 81b is not shown in FIG. 23, but transmits the rotation of the first shaft 811b to the second shaft 812b, like the other belts 816a and 816c.

Figure 25:
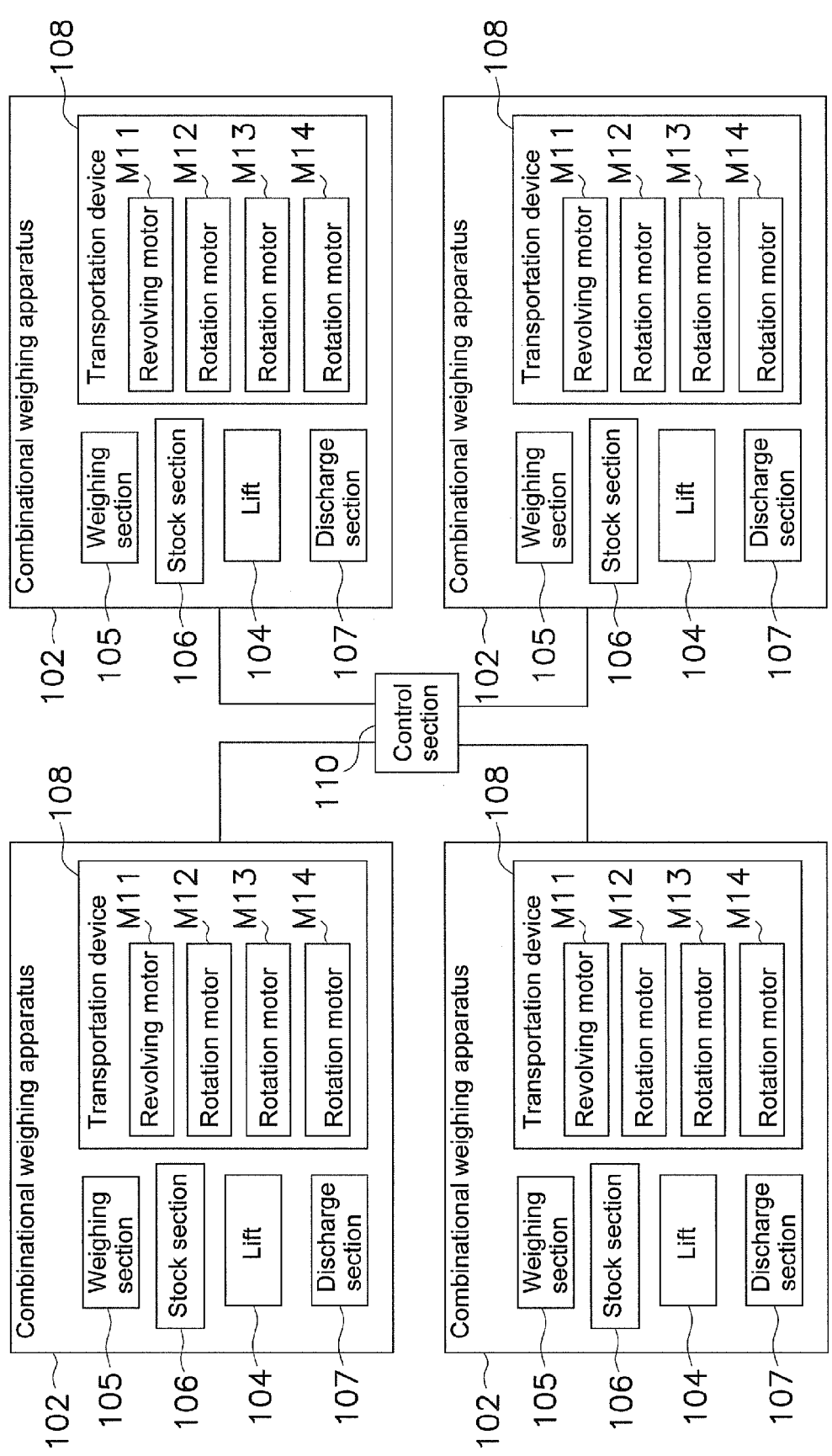
FIG. 25 is a control block diagram.

The control unit 110 includes a CPU, a ROM, a RAM and the like. As shown in FIG. 25, the control unit 110 is connected to the lift 104, the weighing unit 105, the stock unit 106, the discharge unit 107 and the transportation device 108 of each of the combination weighing devices 102. The control unit 110 performs combination calculation of selecting a combination of containers C such that the total weight of the objects in the selected containers C is a value within a predetermined range. The control unit 110 causes the selected containers C to be discharged from the stock units 106. The control unit 110 controls the transportation devices 108 to discharge the objects from the containers C. Such controls will be described in detail below together with a weighing operation.

Weighing Operation

The Operation of Placing an Object in a Container C to Stocking Objects in the Stock Unit 106

First as shown in FIG. 19, an empty container C is carried by the lift 104 to an upper position of the combination weighing device 102. An object is put to the container C automatically by a supply feeder controlled by the control unit 110 or manually by an operator before the empty container C is transferred to the weighing unit 105. The container C containing the object is weighed when passing through the weighing unit 105. The weighing unit 105 sends the weighing data to the control unit 110.

In this example, the weight of the container C containing the object is weighed. Alternatively, the object may be weighed before being put into the container C and then put into the container C.

The container C containing the object to have been weighed in the weighing unit 105 is transferred to the stock unit 106.

The stock unit 106 stocks containers C in empty layers among the five layers 160a, 160b, 160c, 160d and 160e stacked vertically. Namely, the stock unit 106 stocks a plurality of weighed containers C vertically.

The containers C keep on revolving while being stocked in the layers 160a, 160b, 160c, 160d and 160e (see dashed arrow AR1 in FIG. 20).

Operation of Discharging the Container C from the Stock Unit 106 to Transferring the Container C to the Transportation Device 108

The control unit 110 performs combination calculation such that the total weight of objects is close to a preset target weight based on the weighing data obtained in the weighing unit 105. Namely, the control unit 110 selects a plurality of containers C to realize an optimum combination from the containers C stocked in the combination weighing device 102, such that the total weight of the objects matches the target weight or is close to the target weight in a tolerable range. The control unit 110 selects one container C from each of the four combination weighing device 102.

In this example, the subsequent operation will be described with an assumption that a container C stocked in the top layer 160a of one combination weighing device 102 is selected. Substantially the same operation is performed in the other layers 160b, 160c, 160d and 160e and the other combination weighing devices 102.

When a container C is selected to be combined, the control unit 110 drives the selection lever 161a of the stock unit 106 containing the selected container C. The moving direction of the container C, which has been moving in the ring-shaped path, is changed by the selection lever 161a, and the container C is discharged in the tangential direction of the rotation (see dashed arrow AR9 in FIG. 20).

The discharged container C is freely dropped in the discharge unit 107 and is transferred to the transportation device 108. Then, a new container C is transferred from the weighing unit 105 to the stock unit 106.

Figure 26:
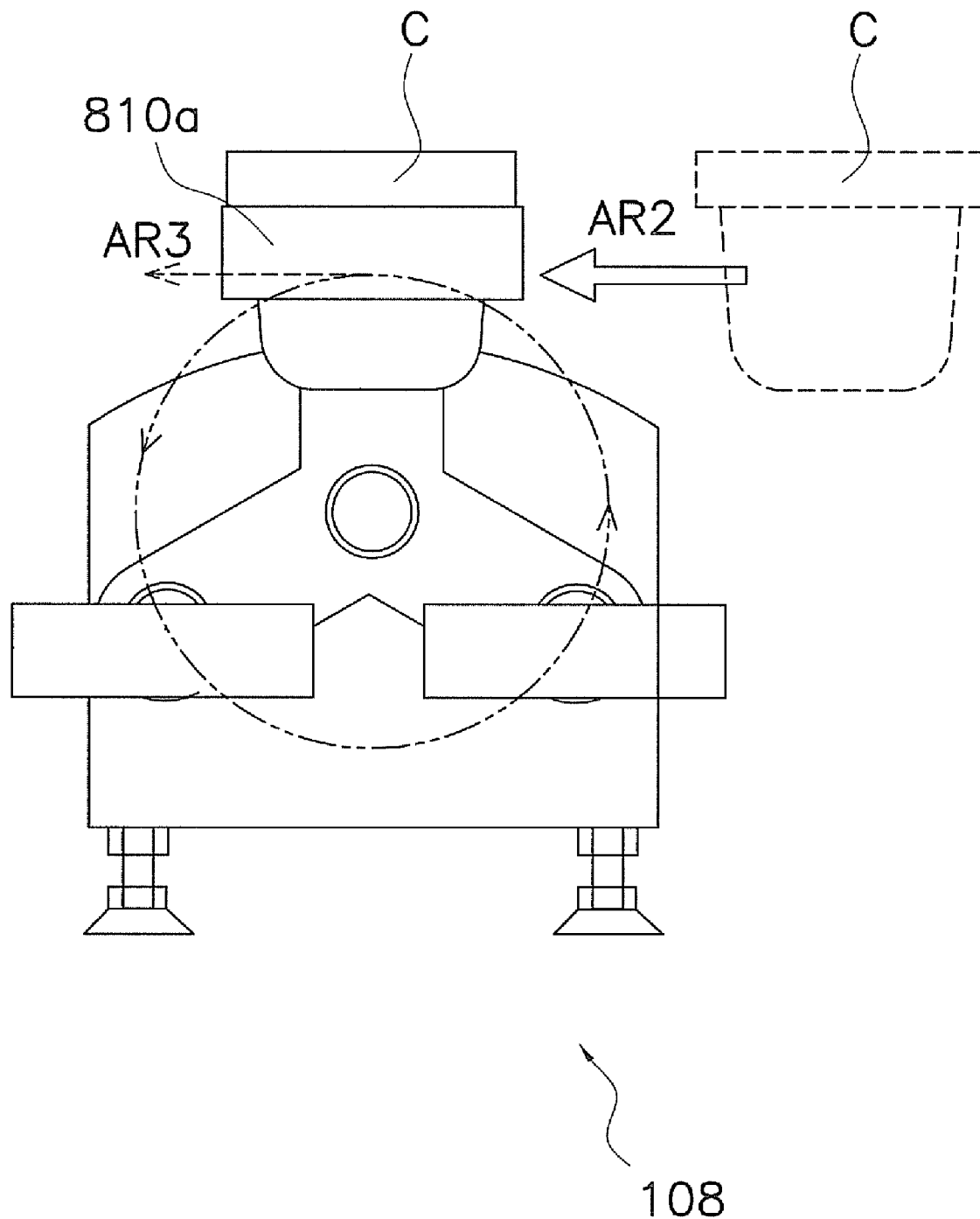
FIG. 26 shows the transfer of a container in the transportation device.

Operation of Transferring the Container C to the Transportation Device 108, to Discharging the Object and Discharging the Emptied Container C As shown in FIG. 26, the container C discharged from the stock unit 106 is received while moving horizontally by the holder 810a moving at the highest point of the revolution thereof, and is held by the holder 810a. At this point, the opening of the U-shaped holder 810a is directed to the container C approaching the holder 810a. The holder 810a receives the container C from the opening and holds the container C. The moving direction of the container C and the tangential direction of the revolution of the holder 810a match each other at the instant when the holder 810a receives the container C (see white arrow AR2 and dashed arrow AR3). The holder 810a receives the container C while revolving.

Figure 27:
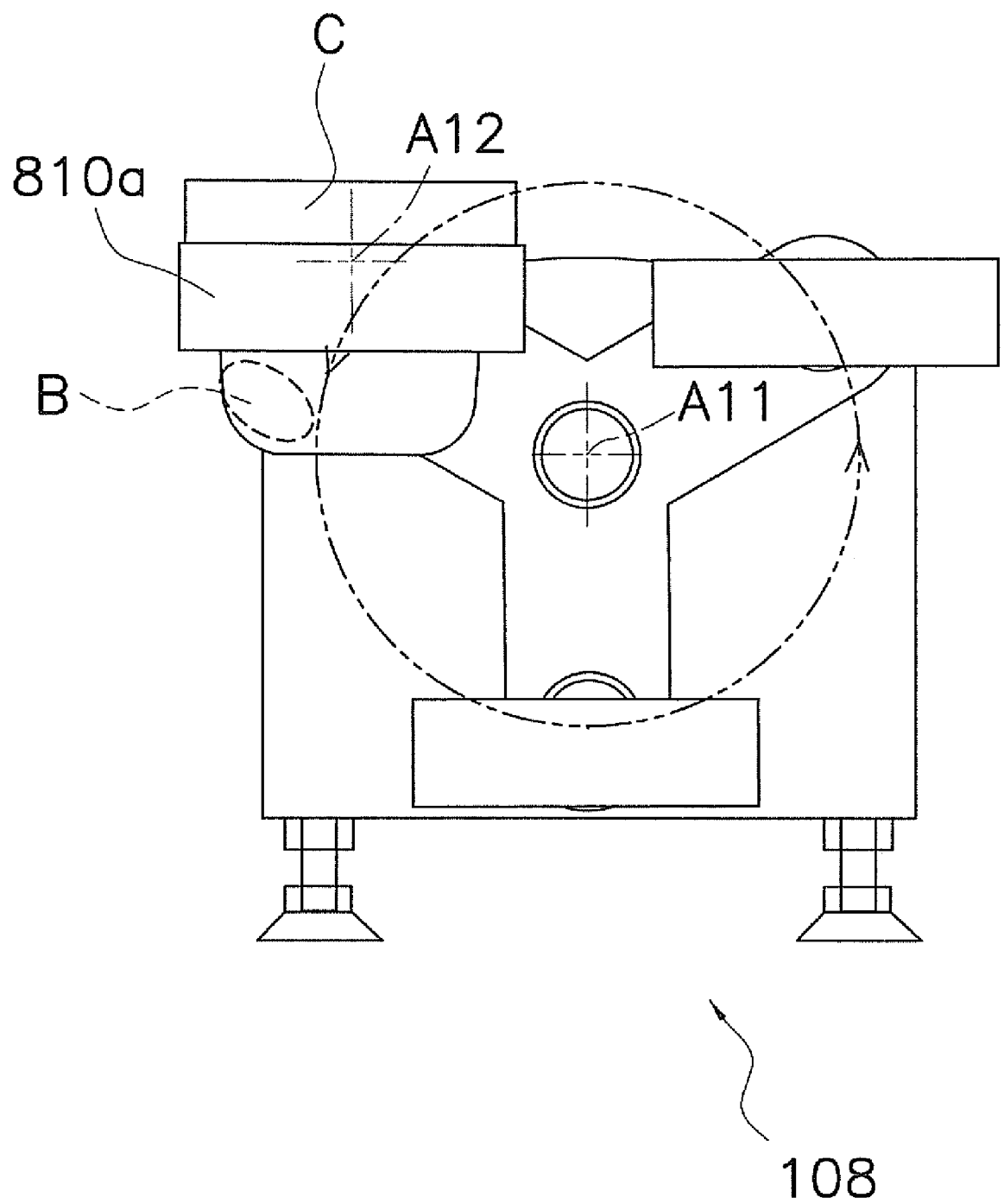
FIG. 27 shows the rotation of a container in the transportation device.

The container C revolves around the revolving axis A11 while being supported by the holder 810a. The two-dot chain line in FIG. 26 represents the revolving track of the holder 810a. The control unit 110 drives the rotation motor M12 in the middle of the revolution of the container C to rotate the holder 810a around the rotation axis A12 as shown in FIG. 27, such that the container C is open upward. In this manner, the control unit 110 controls the orientation of the container C. Thus, an object B contained in the container C revolves without being dropped outside the container C.

Figure 28:
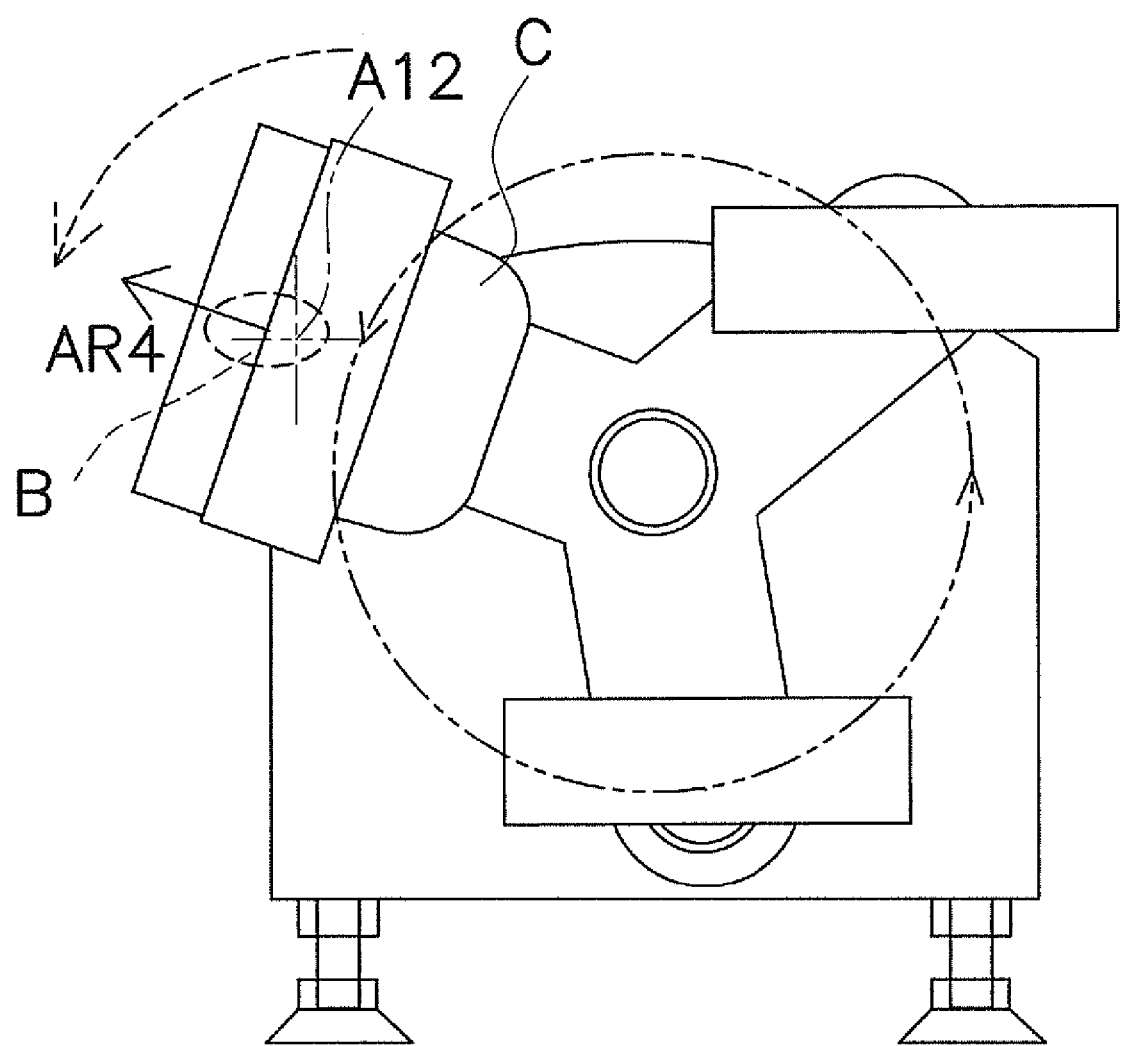
FIG. 28 shows the discharge of an object from a container in the transportation device.
Figure 29:
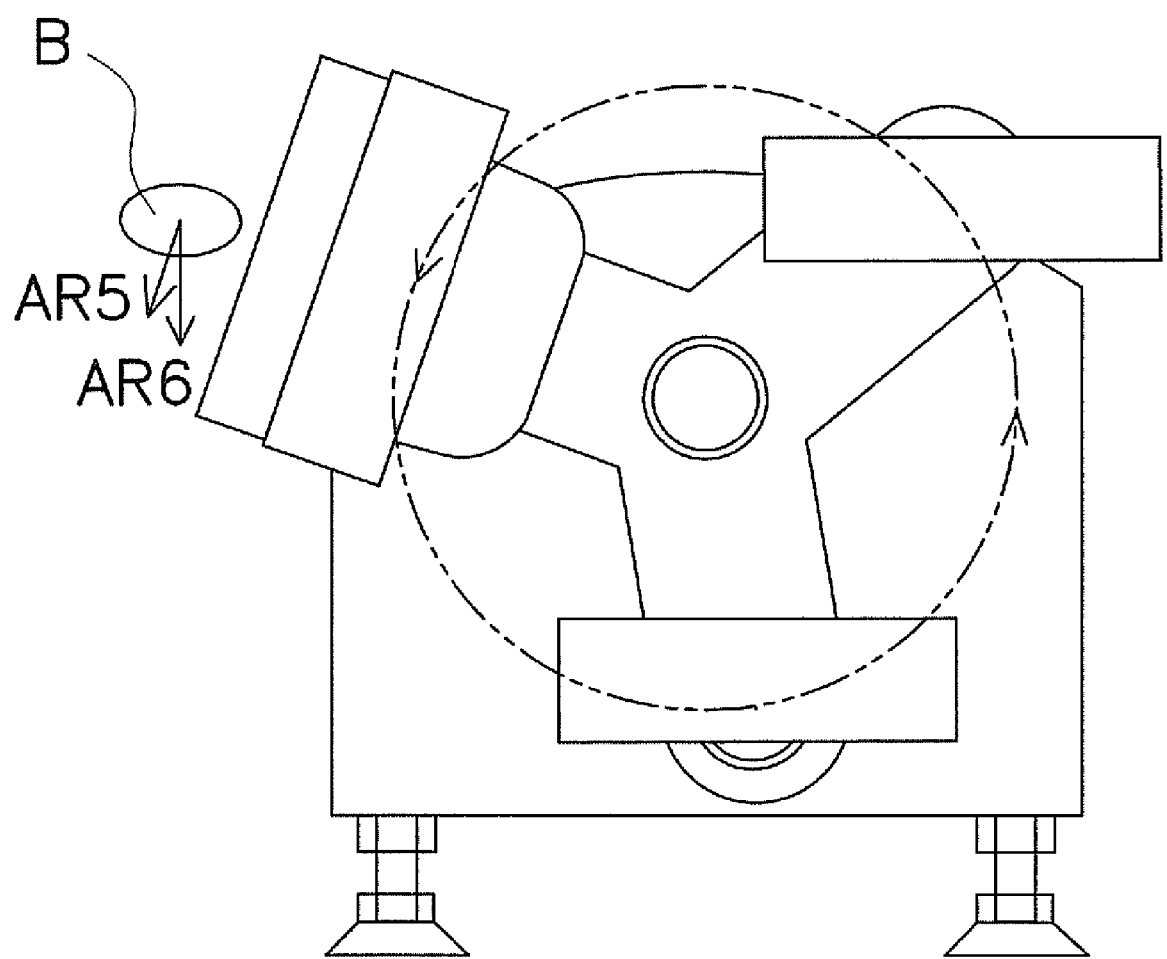
FIG. 29 shows the discharge of an object from a container in the transportation device.

When the container C has revolved at a predetermined angle, as shown in FIG. 28, the control unit 110 rotates the container C around the rotation axis A12, such that the direction of a centrifugal vector generated in the object by the revolution (see solid arrow AR4) matches the opening direction of the container C. This replaces the side surface or the bottom surface of the container C, which has been supporting the object B, with the opening of the container C. The object B, which is not supported by anything now, is discharged from the container C by a centrifugal force as shown in FIG. 29. In this manner, the object B is released from the held state.

The track of the object B discharged from the container C is influenced by the velocity vector of the object by the revolution at the instant when the object B is discharged (see solid arrow AR5) and the acceleration of gravity (see solid arrow AR6). Therefore, the control unit 110 calculates the track of the object discharged from the container C based on the velocity vector and the acceleration of gravity, and controls the revolution speed, the rotation speed, the rotation timing and the like, so as to transfer the object B to an arbitrary position.

Figure 30:
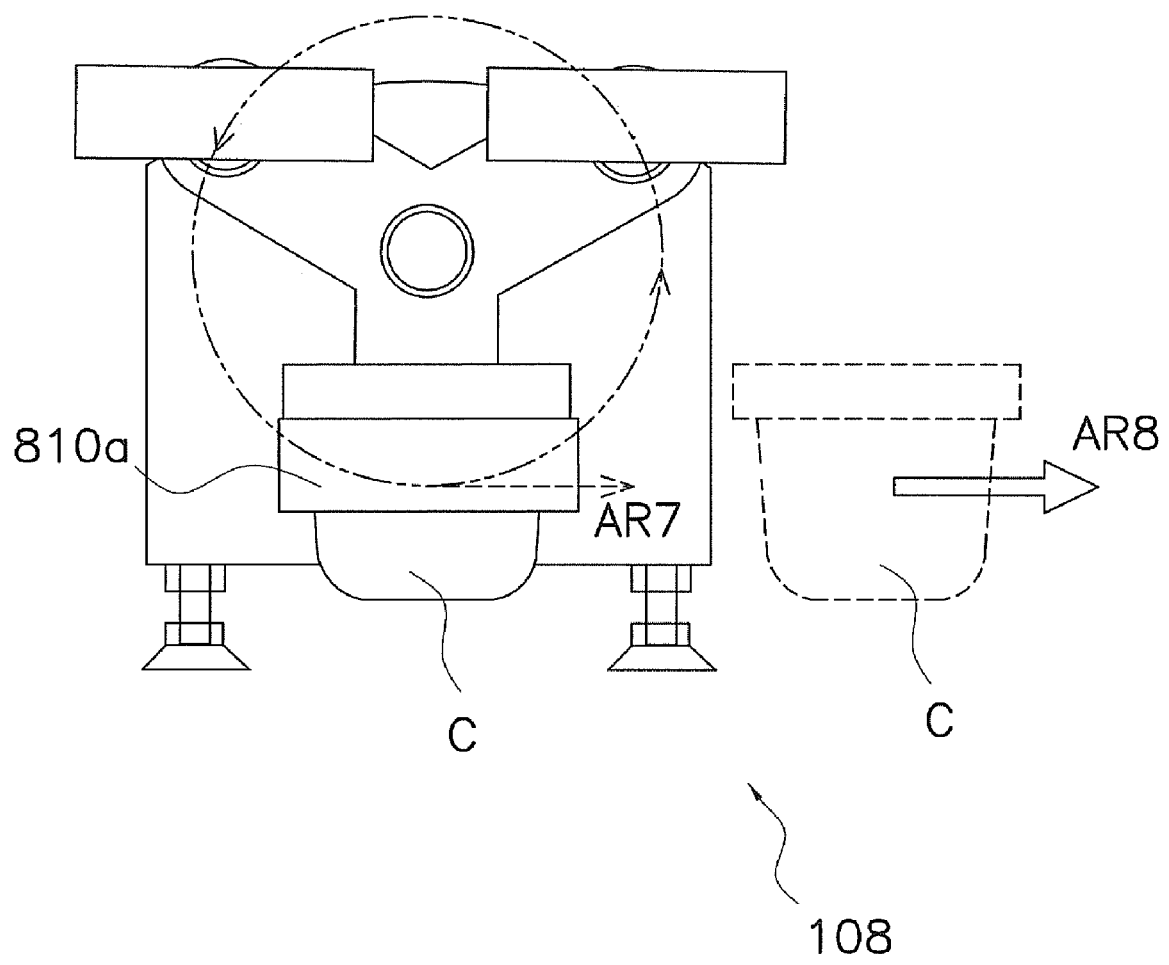
FIG. 30 shows the discharge of an empty container from the transportation device.

As shown in FIG. 30, the container C emptied as a result of the object B being discharged is inverted back to the original orientation while further revolving. While the holder 810a is moving at the lowest point of the revolution thereof, the container C is separated from the holder 810a horizontally and is discharged from the transportation device 108. The tangential direction of the revolution and the direction in which the container C is separated match each other at the instant when the container C is separated from the holder 810a (see dashed arrow AR7 and white arrow AR8). The empty container C discharged from the transportation device 108 is supplied with an object and is transferred back to the weighing unit 105 by the lift 104.

The object B discharged from the transportation device 108 is supplied to the discharge chute 109 and is discharged to the collective chute 103. The collective chute 103 also collects objects discharged from the other combination weighing devices 102, and discharges the objects having a predetermined weight value.

Features of the Combination Weighing Device in this Embodiment (1) With the combination weighing device 102, a container C revolves in each of the layers 160a, 160b, 160c, 160d and 160e in the stock unit 106, and is discharged in the tangential direction of the rotation from the stock unit 106. Since the container C is discharged using the motion thereof, the container C can be discharged more quickly than the case where the container C is discharged in a stationary state. Owing to this, the combination weighing device 102 can expedite the step of discharging the container C. Since the container C is discharged in the tangential direction of the revolution in the combination weighing device 102, the moving direction and the discharge direction of the container C match each other. Therefore, the container C is discharged while maintaining the velocity vector at the instant when the container C is discharged. This allows the object to be transferred smoothly.

(2) With the combination weighing device 102, the containers C are stocked in the layers 160a, 160b, 160c, 160d and 160e arranged vertically. Therefore, the combination weighing device 102 can reduce the planar area of the stock unit 106 for stocking containers C. Owing to this, the installment area of the combination weighing device 102 is smaller than that of a combination weighing device for stocking containers C two-dimensionally. Especially for stocking containers C while moving the containers C, a space for moving the containers C is required and thus increases the installment area of the device. The combination weighing device 102 suppresses an increase in the installment area by stocking containers C vertically.

(3) With the combination weighing device 102, containers C stocked vertically in the stock unit 106 are discharged in the discharge unit 107 by free drop. Therefore, a drive unit for moving the container C from a top part to a bottom part of the combination weighing device 102 to discharge the container C can be eliminated. Owing to this, the combination weighing device 102 has a simplified structure for discharging a container C.

(4) With the combination weighing system 100, one container C is discharged from each of the four combination weighing devices 102. This reduces the time for discharging and expedites the operation. Since one container is selected and discharged from each combination weighing device 102, all the combination weighing devices 102 operate concurrently or continuously to be used for the combination weighing. Therefore, the combination weighing devices 102 can be efficiently operated to expedite the combination weighing. When necessary, two or more containers C may be selected and discharged from each combination weighing device 102. In this case, the number of containers C used for the combination weighing is increased, which improves the precision of the combination weighing. Since the four combination weighing devices 102 are used in combination, the operation can be expedited than the case where the combination weighing is performed by one combination weighing device 2.

(5) If the number of layers arranged vertically in the combination weighing device 102 is increased in order to increase the number of containers C which can be stocked, the combination weighing device 102 becomes excessively high. However, the combination weighing system 100 uses four combination weighing devices 102 in combination. This increases the number of containers C which can be stocked and suppresses each weighing device 2 from becoming excessively high.

(6) In this embodiment, the combination weighing device 102 weighs an object contained in the container C. Alternatively, the weight of the objects may be converted into the number of objects using unit weight, or the number of objects may be measured by a photoelectric tube or the like. In such a case, the combination weighing system 100 provides an effect of discharging objects in a predetermined range of numbers, in addition to the above-described effects. Alternatively, the combination weighing device 102 may measure both the weight of objects and the number of objects. In this case, the combination weighing system 100 provides an effect of discharging objects in a predetermined weight range and a predetermined range of numbers, in addition to the above-described effects.

OTHER EMBODIMENTS

Embodiments of the present invention have been described. The present invention is not limited to the above embodiments, and various modifications are possible without departing from the scope of the invention.

(A) In Embodiment 1, the weighing unit 13, the stock unit 14, and the discharge unit 15 each function as a transporting mechanism of a container C. For example, the weighing device 10 and the transporting mechanism are provided as one single mechanism. The present invention is not limited to this. For example, in the weighing unit 13 or the like, a transporting mechanism of a container C may be provided as a separate mechanism.

(B) In Embodiment 1, the holders 28, 31 and 35 each have a permanent magnet embedded in a bottom plate thereof in order to hold the container C. The present invention is not limited to this. For example, for holding a container C using an electromagnet, the container C can be electronically controlled to be released from the held state. However, when an electromagnet is used, a relatively large-scale unit needs to be mounted. By using the permanent magnet together with the claw member 45 provided in the vicinity of the transfer units 16 as in Embodiment 1, the container C can be held and released from the held state with an inexpensive and simple structure.

(C) In Embodiment 1, the claw member 45 functions as a moving direction change unit for changing the moving direction of a revolving container C and has a function which releases a container C from the held state in each unit. The present invention is not limited to this. For example, a member that functions as a moving direction change unit and a member that functions to release a container C from the held state may be separately provided.

(D) In Embodiment 2, a combination weighing device 50 including four weighing devices 10 is described. The combination weighing device according to the present invention is not limited to this. For example, even one weighing device 10 is capable of functioning as a combination weighing device. However, it is preferable that a combination weighing device includes a plurality of weighing devices 10 as in Embodiment 2 in order to perform the process of weighing to discharging at high speed. For example, the combination weighing device 50 in Embodiment 2 guarantees the capability of performing the process 240 times/min. Accordingly, the number of weighing devices 10 to be used for combination weighing may be determined in accordance with the desired discharging capability.

(E) In Embodiment 1, the vertical movement and the inversion of a container C in the discharge unit 15 are performed by the same drive force. The present invention is not limited to this. For example, the vertical movement and the inversion of a container C may be performed by separate drive elements, which discharges the container C more freely.

(F) In Embodiment 1, the container C is inverted at 180 degrees in the discharge unit 15. The present invention is not limited to this. For example, the container C may be rotated at an angle less than 180 degrees. In this case also, the target object can be discharged from the container C.

(G) In Embodiment 3, the object revolves by causing the arm members 83*a*, 83*b* and 83*c* to revolve around the revolving axis A11. The same effect is provided by causing the container C to revolve by a circulating conveyor.

(H) In Embodiment 3, an object is held and revolves in the state of being contained in a container C. Objects tending to assemble together may be directly held and revolved without being contained in a container C.

Figure 31:
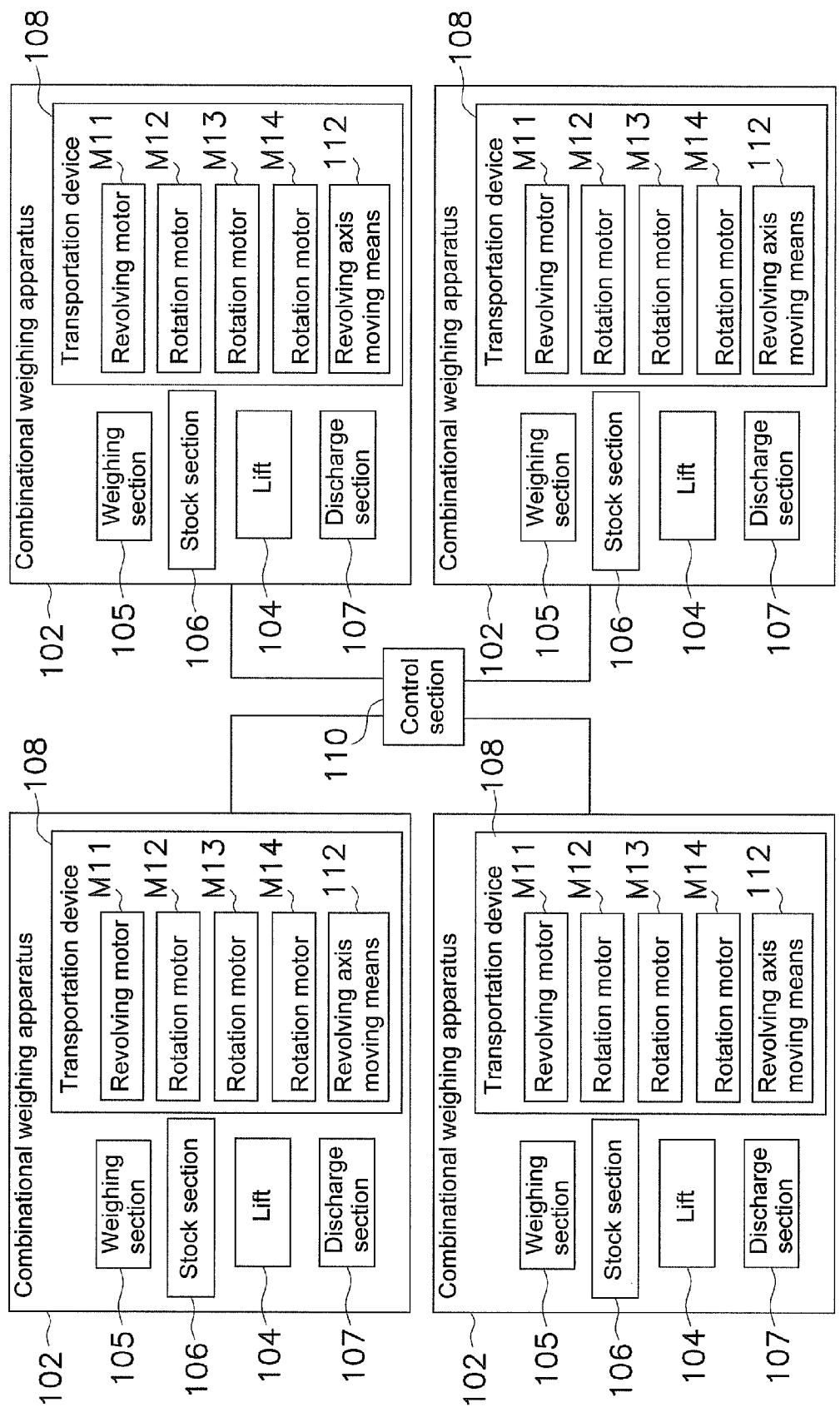
FIG. 31 is a control block diagram of a combination weighing system according to another embodiment of the present invention.

(I) In Embodiment 3, the revolving axis A11 of the revolving mechanism 80 is fixed. Alternatively, revolving shaft moving means 112 for moving the revolving axis A11 may be provided to allow the revolving axis A11 to be movable up and down or right and left. The revolving axis moving means 112 may be a stage slidable up and down and right and left for supporting the revolving shaft 84. The control unit 110 can control the revolving axis moving means 112 to move the revolving axis A11, and thus can control the discharge position of the object more easily (see FIG. 31). For example, for elevating the discharge position of the object, the revolving axis moving means 112 may be controlled to elevate the revolving axis A11. It is also possible to use the revolving axis moving means 112 to move the revolving axis A11 horizontally to discharge an object to a position farther in a horizontal direction, or it is possible to move the revolving axis moving means 112 by a very short distance to fine-tune the discharge position of the object.

(J) In Embodiment 3, the transportation device 108 receives a container C moving horizontally. The transportation device 108 may receive a container C dropping vertically. By receiving the container C while the tangential direction of the revolution of the holders 810a, 810b and 810c is vertically downward, the free drop of the container C can be used and the transfer of the object can be expedited. By discharging the container C vertically while the tangential direction of the revolution of the holders 810a, 810b and 810c is vertical, the revolution is not prevented by the discharge of the container C and the operation can be further expedited.

(K) In Embodiment 3, the revolving mechanism 80 causes a container C containing an object to revolve around the revolving axis A11 in a vertical plane. The container C may revolve in a horizontal plane. In this case also, the same effects as those provided by the transportation device 108 are provided, including the effect in which the discharge position of the object can be easily controlled and the revolution speed can be used to expedite the transfer.

INDUSTRIAL APPLICABILITY

A weighing device, a combination weighing device, and a weighing method according to the present invention achieve high speed weighing, are widely applicable to various weighing devices and the like that weigh various types of objects, and are not limited to food items or the like such as potato chips or pickles.

The invention claimed is:

1. A weighing device, comprising:
    a weighing unit configured to weigh a container containing a target object without stopping a movement of the container;
    a stock unit configured to circulate a plurality of containers within the stock unit so that the containers are accumulated without stopping movements of the containers transported thereto from the weighing unit;
    a discharge unit configured to discharge the target object from a container selectively retrieved from the stock unit without stopping a movement of the container; and
    a moving mechanism configured to move the container in the weighing unit, the stock unit, and the discharge unit.

2. A weighing device according to claim 1, further comprising a transfer unit configured to transfer the container between at least the weighing unit, the stock unit, and the discharge unit.

3. A weighing device according to claim 2, further comprising a moving direction change unit configured to change a moving direction of the container in the vicinity of the transfer unit.

4. A weighing device, comprising:
    a weighing unit configured to weigh a container containing a target object without stopping a movement of the container;
    a stock unit configured to accumulate a plurality of containers without stopping movements of the containers transported thereto from the weighing unit;
    a discharge unit configured to discharge the target object from a container selectively retrieved from the stock unit without stopping a movement of the container; and
    a moving mechanism configured to move the container in the weighing unit, the stock unit, and the discharge unit, wherein the weighing unit moves together with the container.

5. A weighing device according to claim 4, wherein the weighing unit is in a stationary state relative to the container when weighing the container.

6. A weighing device according to claim 1, comprising a plurality of weighing units.

7. A weighing device according to claim 1, wherein the stock unit is located immediately upstream of the discharge unit.

8. A weighing device according to claim 1, wherein the weighing unit, the stock unit, and the discharge unit move the container two-dimensionally.

9. A weighing device, comprising:
    a weighing unit configured to weigh a container containing a target object without stopping a movement of the container;
    a stock unit configured to accumulate a plurality of containers without stopping movements of the containers transported thereto from the weighing unit;
    a discharge unit configured to discharge the target object from a container selectively retrieved from the stock unit without stopping a movement of the container; and
    a moving mechanism configured to move the container in the weighing unit, the stock unit, and the discharge unit, wherein at least one of the weighing unit, the stock unit, and the discharge unit is configured to move the container three-dimensionally.

10. A weighing device according to claim 1, wherein the weighing unit, the stock unit, and the discharge unit are configured to move a plurality of the containers continuously.

11. A weighing device, comprising:
    a weighing unit configured to weigh a container containing a target object without stopping a movement of the container;
    a stock unit configured to accumulate a plurality of containers without stopping movements of the containers transported thereto from the weighing unit;
    a discharge unit configured to discharge the target object from a container selectively retrieved from the stock unit without stopping a movement of the container; and
    a moving mechanism configured to move the container in the weighing unit, the stock unit, and the discharge unit wherein the moving mechanism is configured to rotate the weighing unit, the stock unit, and the discharge unit; and the rotating weighing unit, stock unit, and discharge unit are configured to move the container.

12. A weighing device according to claim 1, wherein the weighing unit, the stock unit, and the discharge unit each comprise a holding unit configured to hold the container.

13. A weighing device, comprising:
    a weighing unit configured to weigh a container containing a target object without stopping a movement of the container;
    a stock unit configured to accumulate a plurality of containers without stopping movements of the containers transported thereto from the weighing unit;
    a discharge unit configured to discharge the target object from a container selectively retrieved from the stock unit without stopping a movement of the container; and
    a moving mechanism configured to move the container in the weighing unit, the stock unit, and the discharge unit, wherein the weighing unit, the stock unit, and the discharge unit each comprise a holding unit configured to hold the container,
    wherein a transfer unit for transferring the container is provided in at least one position between the weighing unit, the stock unit, and the discharge unit; and
    a holding release member configured to release the container held by the holding unit is located in the vicinity of the transfer unit.

14. A weighing device according to claim 1, further comprising a supply unit configured to supply a target object to the moving container.

15. A weighing device according to claim 1, wherein the container is in constant movement after being supplied with the target object in the supply unit until the target object is discharged therefrom in the discharge unit and returned to the weighing unit.

16. A combination weighing device comprising one or a plurality of weighing devices according to claim 1.

17. A weighing method for weighing a target object contained in a container, the method comprising:
- weighing the container containing the target object without stopping a movement of the container;
- circulating a plurality of containers which have been weighed so that the containers are accumulated without stopping movements of the plurality of containers; and
- selectively retrieving a desired container from the plurality of accumulated containers and discharging the target object from the container without stopping a movement of the container.

18. A weighing device according to claim 1, wherein the stock unit is configured to circulate the plurality of containers received from the weighing unit.

19. A weighing device according to claim 1, wherein a new container is added from the weighing unit to the stock unit at a position in which the container transferred to the discharge unit had been held.

* * * * *